(12) United States Patent
Hsu et al.

(10) Patent No.: US 12,100,732 B2
(45) Date of Patent: Sep. 24, 2024

(54) SEMICONDUCTOR DEVICE AND METHOD OF MANUFACTURING SAME

(71) Applicant: TAIWAN SEMICONDUCTOR MANUFACTURING COMPANY, LTD., Hsinchu (TW)

(72) Inventors: Chia-Wei Hsu, Hsinchu (TW); Bo-Ting Chen, Hsinchu (TW); Jam-Wem Lee, Hsinchu (TW)

(73) Assignee: TAIWAN SEMICONDUCTOR MANUFACTURING COMPANY, LTD, Hsinchu (TW)

( * ) Notice: Subject to any disclaimer, the term of this patent is extended or adjusted under 35 U.S.C. 154(b) by 130 days.

(21) Appl. No.: 17/459,703

(22) Filed: Aug. 27, 2021

(65) Prior Publication Data
US 2023/0064525 A1  Mar. 2, 2023

(51) Int. Cl.
| | |
|---|---|
| *H01L 29/06* | (2006.01) |
| *G06F 30/392* | (2020.01) |
| *G06F 30/3953* | (2020.01) |
| *G06F 30/398* | (2020.01) |
| *H01L 23/522* | (2006.01) |
| *H01L 23/528* | (2006.01) |
| *H01L 27/02* | (2006.01) |
| *G06F 119/02* | (2020.01) |

(52) U.S. Cl.
CPC ........ *H01L 29/0607* (2013.01); *G06F 30/392* (2020.01); *G06F 30/3953* (2020.01); *G06F 30/398* (2020.01); *H01L 23/5226* (2013.01); *H01L 23/5283* (2013.01); *H01L 23/5286* (2013.01); *H01L 27/0296* (2013.01); *G06F 2119/02* (2020.01)

(58) Field of Classification Search
CPC ............ H01L 29/0607; H01L 23/5226; H01L 23/5283; H01L 23/5286; H01L 27/0296; G06F 30/392; G06F 30/398; G06F 30/3953; G06F 2119/02
USPC ........................................................ 257/401
See application file for complete search history.

(56) References Cited

U.S. PATENT DOCUMENTS

| | | | |
|---|---|---|---|
| 5,290,724 A * | 3/1994 | Leach | H01L 27/0259 257/361 |
| 7,260,442 B2 | 8/2007 | Hwang et al. | |
| 9,256,709 B2 | 2/2016 | Yu et al. | |
| 2014/0040838 A1 | 2/2014 | Liu et al. | |
| 2015/0278429 A1 | 10/2015 | Chang | |
| 2016/0006965 A1* | 1/2016 | Lee | H04N 25/75 257/292 |
| 2018/0337146 A1* | 11/2018 | Englekirk | H01L 27/1207 |

* cited by examiner

*Primary Examiner* — Tu-Tu V Ho
(74) *Attorney, Agent, or Firm* — Hauptman Ham, LLP

(57) ABSTRACT

A method of fabricating a semiconductor device includes forming a semiconductor substrate having a first protected circuit, and forming a first guard ring around the first protected circuit including: forming a first wall configured to provide a first reference voltage; and forming a second wall configured to provide a second reference voltage different than the first reference voltage.

20 Claims, 15 Drawing Sheets

SEMICONDUCTOR DEVICE AND METHOD OF MANUFACTURING SAME

BACKGROUND

An integrated circuit (IC) includes one or more semiconductor devices. One way in which to represent a semiconductor device is with a plan view diagram referred to as a layout diagram. Layout diagrams are generated in a context of design rules. A set of design rules imposes constraints on the placement of corresponding patterns in a layout diagram, e.g., geographic/spatial restrictions, connectivity restrictions, or the like. Often, a set of design rules includes a subset of design rules pertaining to the spacing and other interactions between patterns in adjacent or abutting cells where the patterns represent conductors in a layer of metallization.

Typically, a set of design rules is specific to a process/technology node by which will be fabricated a semiconductor device based on a layout diagram. The design rule set compensates for variability of the corresponding process/technology node. Such compensation increases the likelihood that an actual semiconductor device resulting from a layout diagram will be an acceptable counterpart to the virtual device on which the layout diagram is based.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
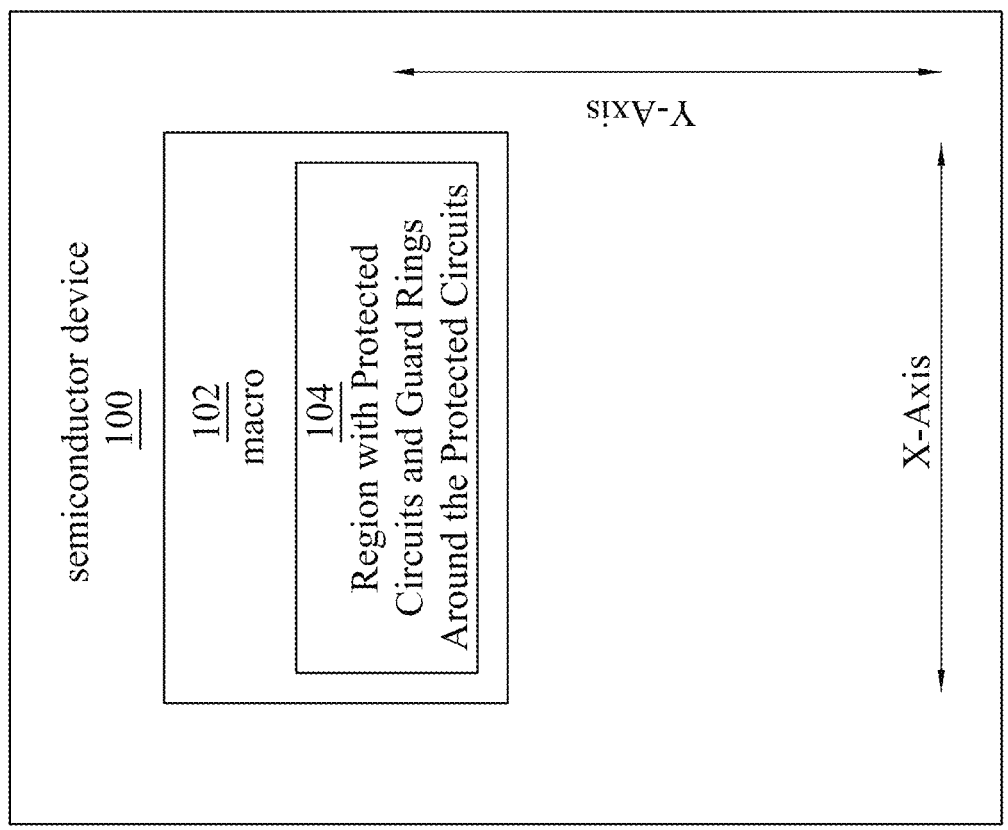
FIG. 1 is a block diagram of a semiconductor device, in accordance with at least some embodiments.

The following disclosure provides different embodiments, or examples, for implementing features of the provided subject matter. Specific examples of components, materials, values, steps, arrangements, or the like, are described below to simplify the present disclosure. These are, of course, merely examples and are not limiting. Other components, materials, values, steps, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In some embodiments, a method of manufacturing a semiconductor device includes generating a layout diagram, the latter including: generating a semiconductor substrate (SS) shape that represents a semiconductor substrate having one or more active semiconductor components; generating supra-SS shapes over the SS shape that represent conductive structures formed over the semiconductor substrate, a subset of the supra-SS shapes including non-buried power grid (non-BPG) shapes which represent corresponding non-BPG conductive structures; generating sub-SS shapes under the SS shape that represent conductive structures formed below the semiconductor substrate, a subset of the sub-SS shapes including buried power grid (BPG) shapes which represent corresponding BPG conductive structures; configuring a first group of shapes to represent a first protected circuit, the first group including corresponding portions of the SS shape; and configuring a second group of shapes to represent a first guard ring shape around the first protected circuit shape, the second group including corresponding portions of the SS shape, corresponding ones of the supra-SS shapes including the non-BPG shapes, and corresponding ones of the sub-SS shapes including the non-BPG shapes such that the second group represents a first guard ring shape around the first protected circuit shape. By providing the second group (which represents the guard ring) with both the non-BPG shapes and the BPG shapes, the layout diagram is a dual-architecture-compatible design. For at least some embodiments, a layout diagram which has a dual-architecturecompatible design is a parent layout diagram that can be selectively pruned of shapes resulting in a first child layout diagram that has a non-BPG type of architecture or a second child layout diagram that has a BPG type of architecture. Pruning the parent layout diagram merely removes shapes from the parent layout diagram; accordingly, pruning is a simple process. In such embodiments, an advantage of the first child layout diagram is that the protected circuit represented therein does not have to be adaptively redesigned in order to be compliant with the non-BPG type of architecture. In such embodiments, an advantage of the second child layout diagram is that the protected circuit represented therein does not have to be adaptively redesigned in order to be compliant with the BPG type of architecture.

FIG. 1 is a block diagram of a semiconductor device 100, in accordance with at least some embodiments.

In FIG. 1, semiconductor device 100 includes, among other things, a macro 102. In some embodiments, a macro 102 is a memory, a power grid, a cell or cells, an inverter, a latch, a buffer and/or any other type of circuit arrangement that is representable digitally in a cell library. In some embodiments, circuit macro 102 is understood in the context of an analogy to the architectural hierarchy of modular programming in which subroutines/procedures are called by a main program (or by other subroutines) to carry out a given computational function. In this context, semiconductor device 100 uses circuit macro/module 102 to perform one or more given functions. Accordingly, in this context and in terms of architectural hierarchy, semiconductor device 100 is analogous to the main program and macro 102 is analogous to subroutines/procedures. In some embodiments, macro 102 is a soft macro. In some embodiments, macro 102 is a hard macro. In some embodiments, macro 102 is a soft macro which is described/couched digitally in register-transfer level (RTL) code. In some embodiments, synthesis, placement and routing have yet to have been performed on macro 102 such that the soft macro can be synthesized, placed and routed for a variety of process nodes. In some embodiments, macro 102 is a hard macro which is described/couched digitally in a binary file format (e.g., Graphic Database System II (GDSII) stream format), where the binary file format represents planar geometric shapes, text labels, other information and the like of one or more layout-diagrams of macro 102 in hierarchical form. In some embodiments, synthesis, placement and routing have been performed on macro 102 such that the hard macro is specific to a particular process node.

Macro 102 includes a region 104, which includes protected circuits and guard rings that are correspondingly around the protected circuits. In some embodiments, region 104 includes a semiconductor substrate having active regions that extend in a first direction (e.g., parallel to an X-axis). Furthermore, above and/or below the semiconductor substrate, the region 104 includes various metal layers and correspondingly interleaved interconnection layers that are stacked over and/or under the semiconductor substrate to form Back End of Line (BEOL) structures. The BEOL structures provide routing and/or power for the semiconductor device, including the macro 102 and region 104. In some embodiments, the metal layers include conductors that extend in the first direction or in a second direction (e.g., parallel to a Y-axis) transverse to the first direction. In some embodiments, the first direction is orthogonal to the second direction. Furthermore, in some embodiments, one or more metal layers correspondingly include conductors that extend in only the first direction (i.e., have a long axis that extends in the first direction) or the second direction (i.e., have a long axis that extends in the second direction). The guard rings are correspondingly around the protected circuits and correspondingly protect the protected circuits. In some embodiments, the guard rings protect from noise. In some embodiments, the guard rings provide connections to different reference voltages (e.g., a power source voltage, ground).

Figure 2:
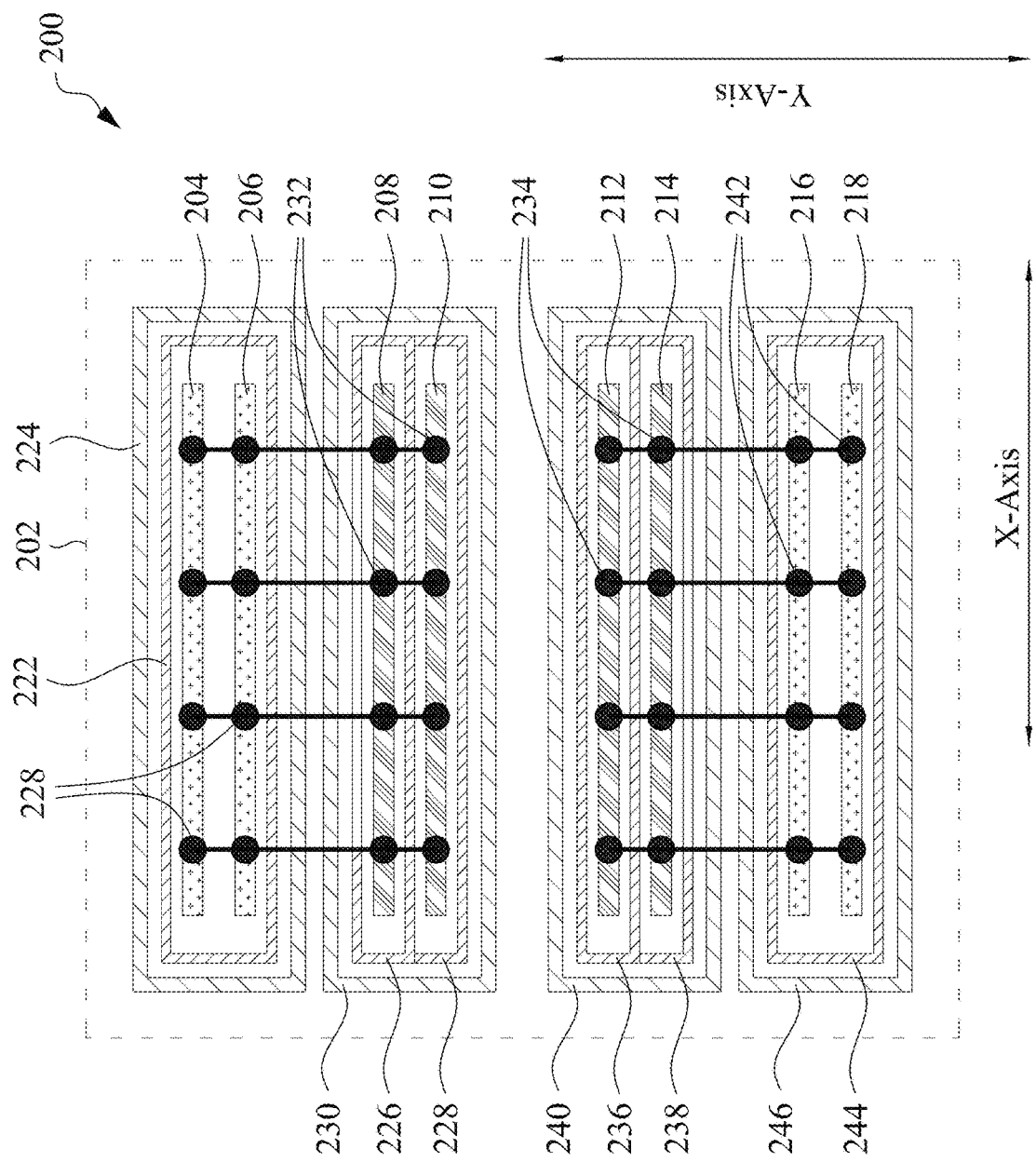
FIG. 2 is a block diagram of a semiconductor device, in accordance with at least some embodiments.

FIG. 2 is a block diagram of a semiconductor device 200, in accordance with at least some embodiments.

Semiconductor device 200 is one example of region 104 in FIG. 1. Semiconductor device 200 includes a semiconductor substrate 202, where active components, such as transistors and diodes, are formed in semiconductor device 200. Semiconductor device 200 includes protected circuits 204, 206, 208, 210, 212, 214, 216, 218. Each of circuits 204-218 is a protected circuit that is protected by at least one guard ring as explained in further detail below. In some embodiments, each of circuits is protected in a sense of reducing, if not eliminating, noise which could escape from one or more of circuits 204-218. In some embodiments, each of circuits 204-218 is protected in a sense of reducing, if not eliminating, noise which could reach and thereby potentially disturb the operation of each of circuits 204-218. In some embodiments, the noise to be protected against is electrostatic discharge (ESD), or the like.

Each of protected circuits 204, 206 is an array of PMOS drivers that is configured to regulate a first reference voltage and provide the regulated first reference voltage to a functional circuit (not shown in FIG. 2). A PMOS driver is a type of transistor driver. In some embodiments, the first reference voltage is a power source voltage VDD. In some embodiments, the functional circuit is a memory circuit, a combinational/combinatorial logic, a sequential device, a sequential state component, a digital processing circuit, a radio frequency (RF) circuit, or the like. Nodes 220 (not all labeled so as to avoid reference number congestion and thereby improve clarity) indicate connections between the PMOS drivers in the array of PMOS drivers of protected circuit 204, 206 and input/output terminals.

As shown in FIG. 2, a guard ring 222 is provided around both of protected circuits 204, 206. Guard ring 222 is configured to be biased at the first reference voltage, which in this example is VDD. Another guard ring 224 is provided around guard ring 222 and thus also around both of protected circuits 204, 206. Guard ring 224 is biased at a second reference voltage, which in this example is VSS. In some embodiments, reference voltage VSS is a negative voltage or a ground voltage. In other embodiments, the first reference voltage is VSS and the second reference voltage is VDD.

Each of protected circuits 208, 210 is an array of electrostatic discharge (ESD) clamp circuits that shunt electrostatic-discharge-induced current to a first reference rail (not shown in FIG. 2). In some embodiments, each of the arrays of the ESD clamp circuits in protected circuits 208, 210 is an array of pull-up (PU) ESD clamp circuits where the first reference rail is biased to the first reference voltage, which in this example is VDD. In some embodiments, each of the PU ESD clamp circuits includes at least one diode configured to transmit ESD current to the first reference rail from an I/O terminal. Nodes 232 (not all labeled for the sake of clarity) indicate connections between the ESD clamp circuits in protected circuits 208, 210 and input/output terminals.

As shown in FIG. 2, a guard ring 226 is provided around protected circuit 208 and a guard ring 228 is provided around protected circuit 210. Guard rings 226, 228 are configured to be biased at the first reference voltage. Another guard ring 230 is provided around guard rings 226, 228 and thus also around both of protected circuits 208, 210. Guard ring 230 is biased at the second reference voltage.

Protected circuits 212, 214 are each an array of ESD clamp circuits that transmit electrostatic-discharge-induced current to a second reference rail (not shown in FIG. 2). In some embodiments, each of the arrays of the ESD clamp circuits in protected circuits 212, 214 is an array of pull-down (PD) ESD clamp circuit where the second reference rail is biased to the second reference voltage, which in this example is VSS (e.g., ground voltage). In some embodiments, each of the PD ESD clamp circuits includes at least one diode configured to transmit ESD current to the second reference rail from an I/O terminal. Nodes 234 (not all labeled for the sake of clarity) indicate connections between the ESD clamp circuits in protected circuits 212, 214 and input/output terminals.

As shown in FIG. 2, a guard ring 236 is provided around protected circuit 212 and a guard ring 238 is provided around protected circuit 214. Guard rings 236, 238 are configured to be biased at the second reference voltage. Another guard ring 240 is provided around guard rings 236, 238 and thus also around both of protected circuits 212, 214. Guard ring 240 is biased at the first reference voltage.

Each of protected circuits 216, 218 is an array of NMOS drivers that are configured to regulate the second voltage and to provide the regulated second voltage to a functional circuit (not shown in FIG. 2). A NMOS driver is a type of transistor driver. Nodes 242 (not all labeled for the sake of clarity) indicate connections between the NMOS drivers in the array of NMOS drivers of protected circuits 216, 218 to input/output terminals.

As shown in FIG. 2, a guard ring 244 is provided around both of protected circuits 216, 218. Guard ring 244 is configured to be biased at the second reference voltage. Another guard ring 246 is provided around guard ring 244 and thus also around both of protected circuits 216, 218. Guard ring 244 is biased at a first reference voltage.

In some embodiments, semiconductor device 200 includes a non-buried power grid (non-BPG) type of architecture in which reference voltage rails and power conductors are provided over semiconductor substrate 202. However, in other embodiments, semiconductor device 200 includes a buried power grid (BPG) type of architecture in which reference voltage rails and power conductors are provided beneath semiconductor substrate 202. In some embodiments, if semiconductor device 200 includes the BPG, input/output signals are also routed from a metal terminal (e.g., metal pad, metal pin, metal contact, or the like). At least some embodiments (discussed below) provide designs and design techniques that are compatible with each of the non-BPG architecture and BPG architecture, which is referred to herein as being dual architecture compatible. According to some embodiments, a dual architecture compatible design is a parent layout diagram that facilitates variability and portability, and facilitates a designer's ability to generate a first child layout diagram by merely correspondingly pruning the parent layout diagram and thereby select the non-BPG architecture version of a circuit or generate a second child layout diagram by merely correspondingly pruning the parent layout diagram and thereby select the BPG architecture version of a circuit depending upon which is appropriate for a particular application, and wherein merely having to correspondingly prune the parent layout diagram avoids otherwise having to adaptively redesign in order to be compliant with the non-BPG type of architecture or the BPG type of architecture.

Figure 3:
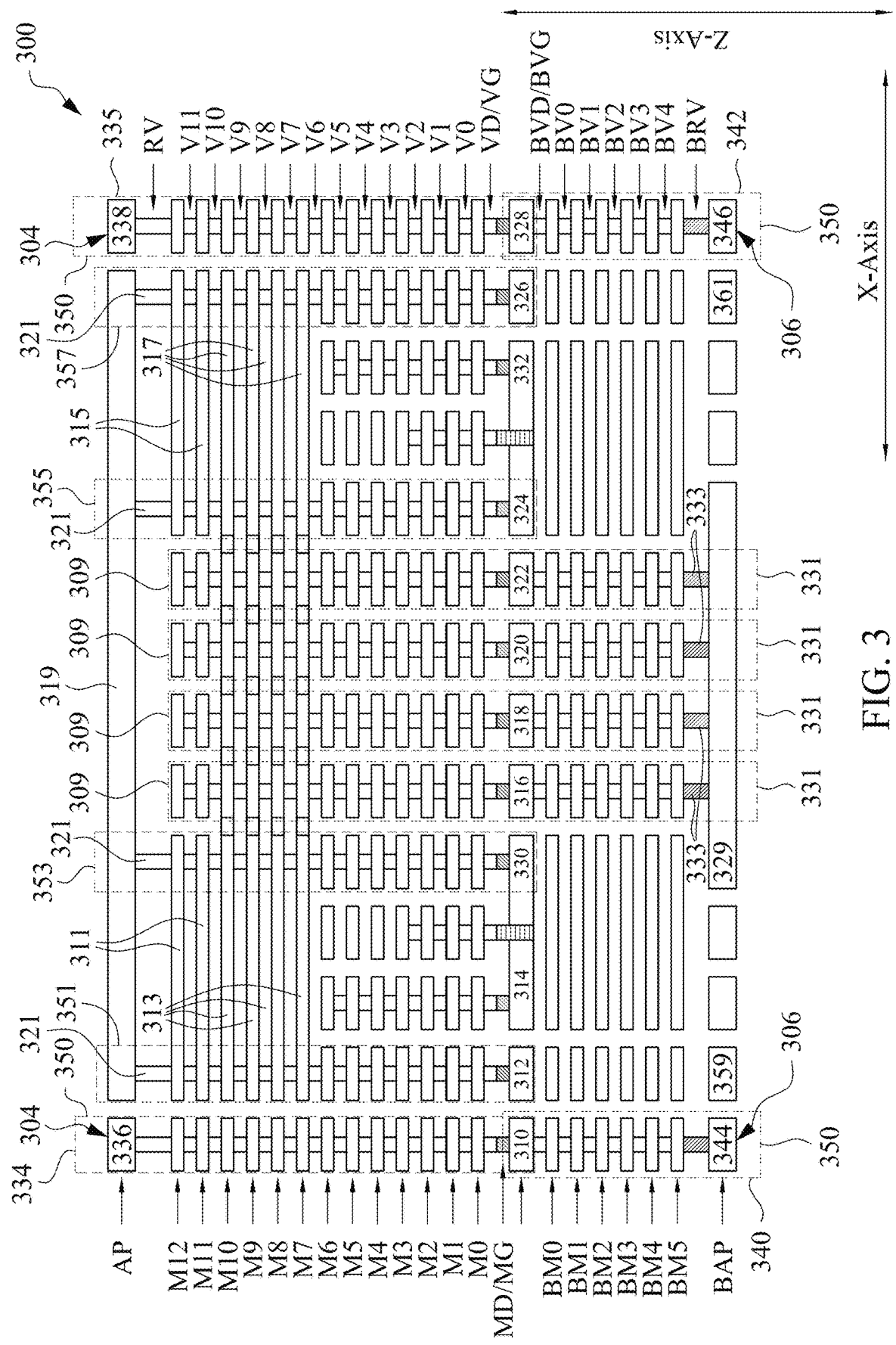
FIG. 3 is cross section of a dual-architecture-compatible layout diagram that represents a semiconductor device, in accordance with some embodiments.

FIG. 3 is a cross section of a dual-architecture-compatible layout diagram 300 that represents a semiconductor device, in accordance with some embodiments.

Layout diagram 300 includes a set of shapes that represent components of a semiconductor device. Furthermore, layout diagram 300 is dual-architecture-compatible in a sense that selectively pruning shapes from layout diagram 300 yields either a first layout diagram which has a first type of architecture or a second layout diagram which has a second type of architecture. More particularly, pruning a subset of shapes from layout diagram 300 yields a first layout diagram (see cross-section of FIG. 4) which represents a semiconductor device which has the non-buried power grid (again, non-BPG) type of architecture. Pruning a subset of shapes from layout diagram 300 yields a second layout diagram (see cross-section of FIG. 5) which represents a semiconductor device which has the buried power grid (again, BPG) type of architecture.

In some embodiments, selectively pruning the set of shapes included in layout diagram 300 as noted above is described as selectively disconnecting layout diagram 300, i.e., selectively removing shapes from layout diagram 300. In some embodiments, selectively pruning the set of shapes included in layout diagram 300 as noted above is described as selectively paring layout diagram 300, i.e., selectively removing shapes from layout diagram 300. In some embodiments, selectively pruning the set of shapes included in layout diagram 300 as noted above is described as selectively trimming layout diagram 300, i.e., selectively removing shapes from layout diagram 300.

Discussion of FIG. 3 will refer to shapes in layout diagram 300 as if they are components of the semiconductor device which has the non-BPG type of architecture or are components of the semiconductor device which has the BPG type of architecture. The same is true for other layout diagrams discussed below. In some embodiments, layout diagram 300 is stored in a computer-readable medium.

Layout diagram 300 is thus provided to facilitate design porting between non-BPG-architecture layout diagrams and BPG-architecture layout diagrams while fulfilling the requirements for both non-BPG processes and BPG processes. In some embodiments, dual-architecture-compatible layout diagram 300 is pruned so that the final semiconductor device represented in a corresponding final layout diagram either has a non-BPG type of architecture which lacks BPG shapes or a BPG type of architecture which includes BPG shapes.

As shown in FIG. 3, layout diagram 300 includes a semiconductor substrate 308. Semiconductor substrate 308 includes a plurality of semiconductor segments 310, 312, 314, 316, 318, 320, 322, 324, 326, 328. In some embodiments, an isolating material is provided in semiconductor substrate 308 between each of semiconductor segments 310, 312, 314, 316, 318, 320, 322, 324, 326, 328, such as a silicon oxide and/or the like. In some embodiments, semiconductor segments 310, 312, 314, 316, 318, 320, 322, 324, 326, 328, are formed from doped and undoped silicon, gallium arsenide, germanium, and/or the like. Semiconductor segment 314 includes a protected circuit 330 and semiconductor segment 324 includes a protected circuit 332. Protected circuits 330, 332 can be any type of suitable protected circuit. In some embodiments, protected circuits 330, 332 correspond to protected circuits 204, 206, protected circuits 208, 210, protected circuits 212, 214, or protected circuits 216, 218 in FIG. 2. Accordingly, active semiconductor components are provided in protected circuits 330, 332 such as transistors, diodes, varactors, and/or the like.

In FIG. 3, semiconductor substrate 308 is shown as extending along a first direction, and having a thickness relative to a second direction which is perpendicular to the first direction. In FIG. 3, the first direction is along the X-axis and the second direction is along the Z-axis. In some embodiments, the first and second directions are directions other than those correspondingly along the X-axis and the Z-axis. Semiconductor substrate 308 also extends in a third direction that extends along a Y-axis that extends into and/or out of the page. The Y-axis, the X-axis, and the Z-axis are all perpendicular with respect to one another.

In FIG. 3, relative to the Z-axis, layout diagram 300 further includes layers above semiconductor substrate (SS) 308 which are referred to herein as supra-SS layers, the supra-SS layers including: a contact-to-transistor-component layer (MD/MG layer); a via-between-contact-and-metallization layer (VD/VG layer); a first layer of metallization (M0 layer); a first layer of interconnection (V0 layer); a second layer of metallization (M1 layer); a second layer of interconnection (V1 layer); a third layer of metallization (M2 layer); a third layer of interconnection (V2 layer); a fourth layer of metallization (M3 layer); a fourth layer of interconnection (V3 layer); a fifth layer of metallization (M4 layer); a fifth layer of interconnection (V4 layer); a sixth layer of metallization (M5 layer); a sixth layer of interconnection (V5 layer); a seventh layer of metallization (M6 layer); a seventh layer of interconnection (V6 layer); an eighth layer of metallization (M7 layer); an eighth layer of interconnection (V7 layer); a ninth layer of metallization (M8 layer); a ninth layer of interconnection (V8 layer); a tenth layer of metallization (M9 layer); a tenth layer of interconnection (V9 layer); an eleventh layer of metallization (M10 layer); an eleventh layer of interconnection (V10 layer); a twelfth layer of metallization (M11 layer); a twelfth layer of interconnection (V11 layer); a thirteenth layer of metallization (M12 layer); a thirteenth layer of interconnection (V12 layer); a redistribution layer (RV layer); and a pad layer (AP layer).

In some embodiments, semiconductor substrate 308 has a greater number of supra-SS metallization layers and a correspondingly greater number of supra-SS interconnection layers. In some embodiments, semiconductor substrate 308 has fewer supra-SS metallization layers and correspondingly fewer supra-SS interconnection layers.

Also relative to the Z-axis, layout diagram 300 further includes layers below SS 308 which are referred to herein as sub-SS layers, the sub-SS layers including: a buried contact-to-transistor-component layer (BVD/BVG); a first buried layer of metallization (BM0 layer); a first buried layer of interconnection (BV0 layer); a second buried layer of metallization (BM1 layer); a second buried layer of interconnection (BV1 layer); a third buried layer of metallization (BM2 layer); a third buried layer of interconnection (BV2 layer); a fourth buried layer of metallization (BM3 layer); a fourth buried layer of interconnection (BV3 layer); a fifth buried layer of metallization (BM4 layer); a fifth buried layer of interconnection (BV4 layer); a sixth buried layer of metallization (BM5 layer); a buried redistribution layer (BRV layer); and a buried pad layer (BAP layer).

Non-BPG 304 shown in FIG. 3 includes supra-SS conductors 336, 338. The supra-SS conductor 336 is provided in a first supra-SS via tower 334 at the leftmost portion of the layout diagram 300. Supra-SS conductor 338 is provided in a second supra-SS via tower 335 on the rightmost portion of layout diagram 300. Layout diagram 300 includes supra-SS via towers 309 in a central portion of layout diagram 300. Supra-SS via towers 309 are provided relative to the X axis between semiconductor substrate segment 314 with protected circuit 330 and semiconductor substrate segment 324 with protected circuit 332.

The leftmost supra-SS via tower 309 includes semiconductor substrate segment 316. Semiconductor substrate segment 316 is connected to a contact in the MD/MG metallization layer. The contact in the MD/MG metallization layer connects to a via or via bar in the interconnection layer V0. The leftmost supra-SS via tower 309 includes: conductors in metallization layers M0-M12; and vias or via bars in interconnection layers V0-V11 that correspondingly connect the conductors in the metallization layers M0-M12 of the leftmost supra-SS via tower 309.

The left middle supra-SS via tower 309 includes semiconductor substrate segment 318 at a bottom end relative to the Z-axis. Semiconductor substrate segment 318 is connected to a contact in the MD/MG metallization layer, which connects to a via or via bar in the interconnection layer V0. The left middle supra-SS via tower 309 includes: conductors in metallization layers M0-M12; and vias or via bars in interconnection layers V0-V11 that correspondingly connect the conductors in the metallization layers M0-M12 of the left middle supra-SS via tower 309.

The right middle supra-SS via tower 309 includes semiconductor substrate segment 320 at a bottom end relative to the Z-axis. Semiconductor substrate segment 320 is connected to a contact in the MD/MG metallization layer, which connects to a via or via bar in the interconnection layer V0. The right middle supra-SS via tower 309 includes: conductors in metallization layers M0-M12; and vias or via bars in interconnection layers V0-V11 that correspondingly connect the conductors in the metallization layers M0-M12 of the right middle supra-SS via tower 309.

The rightmost supra-SS via tower 309 includes semiconductor substrate segment 322 at a bottom end relative to the Z-axis. Semiconductor substrate segment 322 is connected to a contact in the MD/MG metallization layer, which connects to a via or via bar in the interconnection layer V0. The rightmost supra-SS via tower 309 includes: conductors in metallization layers M0-M12; and vias or via bars in interconnection layers V0-V11 that correspondingly connect the conductors in the metallization layers M0-M12 of the rightmost supra-SS via tower 309.

Layout diagram 300 includes four instances of supra-SS via towers 309. In other embodiments, layout diagram 300 includes more than four instances of supra-SS via towers 309 and still other embodiments of layout diagram 300 include fewer instances of supra-SS via towers 309. In each of supra-SS via towers 309, the conductors in the metallization layers M12, M11, M6-M0 are not connected to the other conductors in the metallization layers M12, M11, M6-M0 of the other supra-SS via towers 309. Furthermore, the conductors in the metallization layers M12, M11, M6-M0 are not connected to the other conductors 311, 313 in the metallization layers M12, M11, M6-M0. However, the conductors of supra-SS via towers 309 in the metallization layers M10-M7 are connected to one another. Furthermore, the conductors in leftmost supra-SS via tower 309 in the metallization layers M10-M7 are connected to conductors 313 in the metallization layers M10-M7 and the conductors in the rightmost supra-SS via tower 309 are connected to conductors in the metallization layers M10-M7, as explained in further detail below.

Supra-SS conductor 336 and supra-SS conductor 338 are each configured to be biased by a first reference voltage or a second reference voltage. In some embodiments, supra-SS conductors 336, 338 are configured to be biased by the same reference voltage and in other embodiments, supra-SS conductors 336, 338 are configured to be biased by different reference voltages.

In metallization layers M12, M11, between the leftmost supra-SS via tower 309 and supra-SS via tower 334, layout diagram 300 includes conductors 311. These conductors 311 are not connected to the conductors in the metallization layers M12, M11 of supra-SS via towers 309. In metallization layers M10-M7, between the leftmost supra-SS via tower 309 and supra-SS via tower 334, layout diagram 300 includes conductors 313. These conductors 313 are connected to the conductors in the metallization layers M10-M7 of supra-SS via towers 309. Furthermore, the conductors in the metallization layers M10-M7 in the supra-SS via towers 309 are connected to one another.

A conductor 319 is located in the AP metallization layer that connects conductors 311, 313 and conductors 315, 317. In some embodiments, conductor 319 is connected by vias (or via bars) 321 in interconnection layer AP.

In metallization layers M12, M11, between the rightmost supra-SS via tower 309 and supra-SS via tower 335, layout diagram 300 includes conductors 315. These conductors 315 are not connected to the conductors in the metallization layers M12, M11 of the supra-SS via towers 309. In metallization layers M10-M7, between the rightmost supra-SS via tower 309 and supra-SS via tower 335, layout diagram 300 includes conductors 317. These conductors 317 are connected to the conductors in the metallization layers M10-M7 of the supra-SS via towers 309. Furthermore, the conductors in the metallization layers M10-M7 of supra-SS via towers 309 remain connected to one another.

As explained in further detail below, the connections between conductors, 313, 317 to the conductors in the metallization layers M10-M7 of supra-SS via towers 309 are pruned or not, i.e., or remain, depending on whether the non-BPG or the BPG design is selected, as explained in further detail below. More specifically, in the BPG design, supra-SS via towers 309 are used to receive and route input output signals and the connections between conductors, 313, 317 to the conductors in the metallization layers M10-M7 of supra-SS via towers 309 are not removed so that conductors 313, 317 are used to provide routing the input/output signals from supra-SS via towers 309. In contrast, in the non-BPG design, supra-SS via towers 309 are used to receive and route the first reference voltage and the second reference voltage. The conductors in the metallization layers M10-M7 of supra-SS via towers 309 are thus disconnected from one another in order to be able to route the different reference voltages. Furthermore, conductors 313, 317 are used to route input/output signals and thus the conductors in the metallization layers M10-M7 of supra-SS via towers 309 are thus disconnected from conductors 313, 317. Additional explanation with regard to the differences between the BPG-architecture layout diagram and the non-BPG-architecture layout diagram is provided in more detail below with respect to FIG. 3 and FIG. 4.

Supra-SS conductor 336 is the topmost end of supra-SS via tower 334 relative to the Z-axis. Supra-SS conductor 336 is connected to the remainder of first supra-SS via tower 334 by a via or via bar in the RV layer. Supra-SS via tower 334 includes conductors in supra-SS metallization metal layers M12-M0 and vias or via bars in interconnections layers V11-V0 that connect the conductors in supra-SS metallization metal layers M12-M0. Semiconductor substrate segment 310 is provided at a bottom end of first supra-SS via tower 334. Semiconductor substrate segment 310 is connected by a contact in the MD/MG layer and a via or via bar in the interconnection layer VD/VG to the conductor of first supra-SS via tower 334 in the metallization layer M0. In some embodiments, routing is provided to first supra-SS via tower 334 so that components in protected circuits 330, 332 are configured to be biased at the reference voltage at supra-SS conductor 336. In this manner, if non-BPG 304 is selected for the design of layout diagram 300, first supra-SS via tower 334 is used to receive the particular reference voltage and route the reference voltage to other parts of layout diagram 300.

Supra-SS conductor 338 is the topmost end of second supra-SS via tower 335 relative to the Z-axis. Supra-SS conductor 338 is connected to the remainder of second supra-SS via tower 335 by a via or via bar in the RV layer. Supra-SS via tower 335 includes conductors in supra-SS metallization metal layers M12-M0 and vias or via bars in interconnections layers V11-V0 that connect the conductors in supra-SS metallization metal layers M12-M0. Semiconductor substrate 328 is provided at a bottom end of second supra-SS via tower 335. Semiconductor substrate segment 328 is connected by a contact in the MD/MG layer and a via or via bar in the interconnection layer VD/VG to the conductor in second supra-SS via tower 335 in the metallization layer M0. Second supra-SS via tower 335 is in non-BPG 304. In some embodiments, routing is provided to second supra-SS via tower 335 so that components in protected circuits 330, 332 are configured to be biased at the reference voltage provided at supra-SS conductor 338. In this manner, if non-BPG 304 is selected for the design of layout diagram 300, second supra-SS via tower 335 is used to receive the particular reference voltage and route the reference voltage to other parts of the layout diagram 300.

BPG 306 shown in FIG. 3 includes sub-SS conductor 344 and sub-SS conductor 346. Layout diagram 300 includes a first sub-SS via tower 340 at the leftmost portion of the layout diagram 300 and a second sub-SS via tower 342 on the rightmost portion of the layout diagram 300. Sub-SS conductor 344 and sub-SS conductor 346 are each configured to be biased by a first reference voltage or a second reference voltage. The sub-SS conductors 344, 346 are located in the metallization layer BAP. In some embodiments, sub-SS conductors 344, 346 are configured to be biased by the same reference voltage and, in other embodiments, sub-SS conductors 344, 346 are connected to different reference voltages.

Sub-SS conductor 344 is located at the bottommost end of first sub-SS via tower 340 relative to the Z-axis. Sub-SS conductor 344 is in the BPG 306. Sub-SS conductor 344 is connected to the remainder of first sub-SS via tower 340 by a via or via bar in the BRV layer. Sub-SS via tower 340 includes conductors in supra-SS metallization metal layers BM5-BM0 and vias or via bars in interconnections layers BV4-BV0 that connect the conductors in supra-SS metallization metal layers BM5-BM0. Semiconductor substrate segment 310 is provided at a top end of first sub-SS via tower 340. Semiconductor substrate segment 310 is connected by a contact in the MD/MG layer and a via or via bar in the interconnection layer VD/VG to the conductor of first sub-SS via tower 340 in the metallization layer BM0. In some embodiments, routing is provided to first sub-SS via tower 340 so that components in protected circuits 330, 332 are configured to be biased at the reference voltage provided at sub-SS conductor 344. In this manner, if BPG 306 is selected for the design of layout diagram 300, first sub-SS via tower 340 is used to receive the particular reference voltage and route the reference voltage to other parts of the layout diagram 300.

Sub-SS conductor 346 is located at the bottommost end of second sub-SS via tower 342 relative to the Z-axis. Sub-SS conductor 346 is in the BPG 306. Sub-SS conductor 346 is connected to the remainder of second sub-SS via tower 342 by a via or via bar in the BRV layer. Sub-SS via tower 342 includes conductors in supra-SS metallization metal layers BM5-BM0 and vias or via bars in interconnections layers BV4-BV0 that connect the conductors in supra-SS metallization metal layers BM5-BM0. Semiconductor substrate segment 328 is provided at a top end of second sub-SS via tower 342. Semiconductor substrate segment 328 is connected by a contact in the BVD/BVG layer to the conductor in the second sub-SS via tower 342 in the metallization layer BM0. In some embodiments, routing is provided to the second sub-SS via tower 342 so that components in protected circuits 330, 332 are configured to be biased at the reference voltage provided at sub-SS conductor 346. In this manner, if the BPG 306 is selected for the design of layout diagram 300, second sub-SS via tower 342 is used to receive the particular reference voltage and route the reference voltage to other parts of the layout diagram 300.

Layout diagram 300 includes sub-SS via towers 331 in a central portion of the layout diagram 300. Sub-SS via towers 331 are provided relative to the X axis between semiconductor substrate segment 314 with the protected circuit 330 and semiconductor substrate segment 324 with protected circuit 332.

The leftmost sub-SS via tower 331 includes semiconductor substrate segment 316 at a top end relative to the Z-axis. Semiconductor substrate segment 316 is connected to a contact in the BVD/BVG metallization layer, which connects to a via or via bar in the conductor in the sub-SS metallization layer BV0. The leftmost sub-SS via tower 331 includes: conductors in metallization layers BM0-BM5; and vias or via bars in interconnection layers BV0-BV4 that correspondingly connect the conductors in the metallization layers BM0-BM5 of the leftmost sub-SS via tower 331. The conductor in the metallization layer BM5 of the leftmost sub-SS via tower 331 is connected by a via (or via bar) 333 in the buried redistribution layer BRV to a conductor 329 that extends beneath all of the sub-SS via towers 331.

The left middle sub-SS via tower 331 includes semiconductor substrate segment 318 at a top end relative to the Z-axis. The semiconductor substrate segment 318 is connected to a contact in the BVD/BVG metallization layer, which connects to a via or via bar in the conductor in the sub-SS metallization layer BV0. The left middle sub-SS via tower 331 includes: conductors in metallization layers BM0-BM5; and vias or via bars in interconnection layers BV0-BV4 that correspondingly connect the conductors in the metallization layers BM0-BM5 of the left middle sub-SS via tower 331. The conductor in the metallization layer BM5 of the left middle sub-SS via tower 331 is connected by a via (or via bar) 333 in the buried redistribution layer BRV to conductor 329 that extends beneath all of the sub-SS via towers 331.

The right middle sub-SS via tower 331 includes semiconductor substrate segment 320 at a top end relative to the Z-axis. The semiconductor substrate segment 320 is connected to a contact in the BVD/BVG metallization layer, which connects to a via or via bar in the conductor in the sub-SS metallization layer BV0. The right middle sub-SS via tower 331 includes: conductors in metallization layers BM0-BM5; and vias or via bars in interconnection layers BV0-BV4 that correspondingly connect the conductors in the metallization layers BM0-BM5 of the right middle sub-SS via tower 331. The conductor in the metallization layer BM5 of the right middle sub-SS via tower 331 is connected by a via (or via bar) 333 in the buried redistribution layer BRV to a conductor 329 that extends beneath all of sub-SS via towers 331.

The rightmost sub-SS via tower 331 includes semiconductor substrate segment 322 at a top end relative to the Z-axis. The semiconductor substrate segment 322 is connected to a contact in the BVD/BVG metallization layer, which connects to a via or via bar in the conductor in the sub-SS metallization layer BV0. The rightmost sub-SS via tower 331 includes: conductors in metallization layers BM0-BM5; and vias or via bars in interconnection layers BV0-BV4 that correspondingly connect the conductors in the metallization layers BM0-BM5 of the rightmost sub-SS via tower 331. The conductor in the metallization layer BM5 of the rightmost sub-SS via tower 331 is connected by a via (or via bar) 333 in the buried redistribution layer BRV to a conductor 329 that extends beneath all of the sub-SS via towers 331.

It should be noted that semiconductor substrate segments 310, 312, 316, 318, 320, 322, 326, 328 are configured to provide electronic connections to via towers 309, 334, 335, 340, 331, 342, 351, 357. In some embodiments, through substrate vias are provided in semiconductor substrate segments 310, 312, 316, 318, 320, 322, 326, 328 to make connections to via towers 309, 334, 335, 340, 331, 342, 351, 357. In other embodiments metallization layers are provided in semiconductor substrate segments 310, 312, 316, 318, 320, 322, 326, 328 to make connections to via towers 309, 334, 335, 340, 331, 342, 351, 357. In still other embodiments, semiconductor substrate segments 310, 312, 316, 318, 320, 322, 326, 328 are doped to transmit input/output signals or reference voltages to via towers 309, 334, 335, 340, 331, 342, 351, 357.

Another supra-SS via tower 351 includes semiconductor substrate segment 312 at a bottom end relative to the Z-axis. Semiconductor substrate segment 312 is connected to a contact in the MD/MG metallization layer, which connects to a via or via bar in the interconnection layer VG/VD. The supra-SS via tower 351 includes: conductors in the supra-SS metallization layers M0-M6; and vias or via bars in the interconnection layers V0-V5 that correspondingly connect the conductors in the metallization layers M0-M6 of supra-SS via tower 351. A via or via bar in interconnection layer V6 connects to bottommost conductor 313. The conductors 313, 311 are connected by vias or via bars in interconnect layers V7-V11. A via (or via bar) 321 connects the topmost conductor 311 to the conductor 319. Supra-SS via tower 351 includes leftmost portions of the conductors 311, 313, 319.

Another supra-SS via tower 353 includes semiconductor substrate segment 314 at a bottom end relative to the Z-axis. The semiconductor substrate segment 314 is connected to a contact in the MD/MG metallization layer, which connects to a via or via bar in the interconnection layer VG/VD. The supra-SS via tower 353 includes: conductors in the supra-SS metallization layers M0-M6; and vias or via bars in the interconnection layers V0-V5 that correspondingly connect the conductors in the metallization layers M0-M6 of supra-SS via tower 353. A via or via bar in interconnection layer V6 connects to bottommost conductor 313. Conductors 313, 311 are connected by vias or via bars in interconnect layers V7-V11. A via (or via bar) 321 connects the topmost conductor 311 to the conductor 319. Supra-SS via tower 351 includes rightmost portions of the conductors 311, 313 and a portion of the conductor 319 above rightmost portions of conductors 311, 313.

Another supra-SS via tower 355 includes semiconductor substrate segment 324 at a bottom end relative to the Z-axis. Semiconductor substrate segment 324 is connected to a contact in the MD/MG metallization layer, which connects to a via or via bar in the interconnection layer VG/VD. The supra-SS via tower 355 includes: conductors in the supra-SS metallization layers M0-M6; and vias or via bars in the interconnection layers V0-V5 that correspondingly connect the conductors in the metallization layers M0-M6 of supra-SS via tower 355. A via or via bar in interconnection layer V6 connects to bottommost conductor 317. The conductors 317, 315 are connected by vias or via bars in interconnect layers V7-V11. A via (or via bar) 321 connects the topmost conductor 315 to the conductor 319. Supra-SS via tower 351 includes leftmost portions of the conductors 315, 317 and a portion of the conductor 319 above leftmost portions of conductors 315, 317.

Another supra-SS via tower 357 includes semiconductor substrate segment 326 at a bottom end relative to the Z-axis. The semiconductor substrate segment 326 is connected to a contact in the MD/MG metallization layer, which connects to a via or via bar in the interconnection layer VG/VD. The supra-SS via tower 357 includes: conductors in the supra-SS metallization layers M0-M6; and vias or via bars in the interconnection layers V0-V5 that correspondingly connect the conductors in the metallization layers M0-M6 of supra-SS via tower 357. A via or via bar in interconnection layer V6 connects to bottommost conductor 317. The conductors 317, 315 are connected by vias or via bars in interconnect layers V7-V11. A via (or via bar) 321 connects the topmost conductor 315 to the conductor 319. Supra-SS via tower 351 includes leftmost portions of the conductors 317, 315, 319.

A conductor 359 is provided directly adjacent to the right of conductor 344. A conductor 361 is provided directly adjacent to the left of conductor 346. Conductors 359, 361 are used as input/output pads in the BPG design as explained in further detail below.

A guard ring 350 is provided around the protected circuits 330, 332. Guard ring 350 corresponds to any one of guard rings 224, 230, 240, 246 in FIG. 2. As shown in FIG. 3, at least a portion of non-BPG 304 and at least a portion of BPG 306 are included in the guard ring 350. Furthermore, via towers 334, 335, 340, 342 are provided as part of via towers 309, 334, 335, 340, 331, 342. Guard ring 350 is provided around the protected circuits 330, 332 in semiconductor substrate segments 314, 324, e.g., to reduce latch up concerns. The guard ring 350 is used to receive, and be biased by, reference voltages, as explained in further detail below. At least a portion of non-BPG 304 and at least a portion of BPG 306 are included in guard ring 350, guard ring 350 is configured to distribute one or more reference voltage regardless of whether the BPG design or the non-BPG design is selected.

Figure 4:
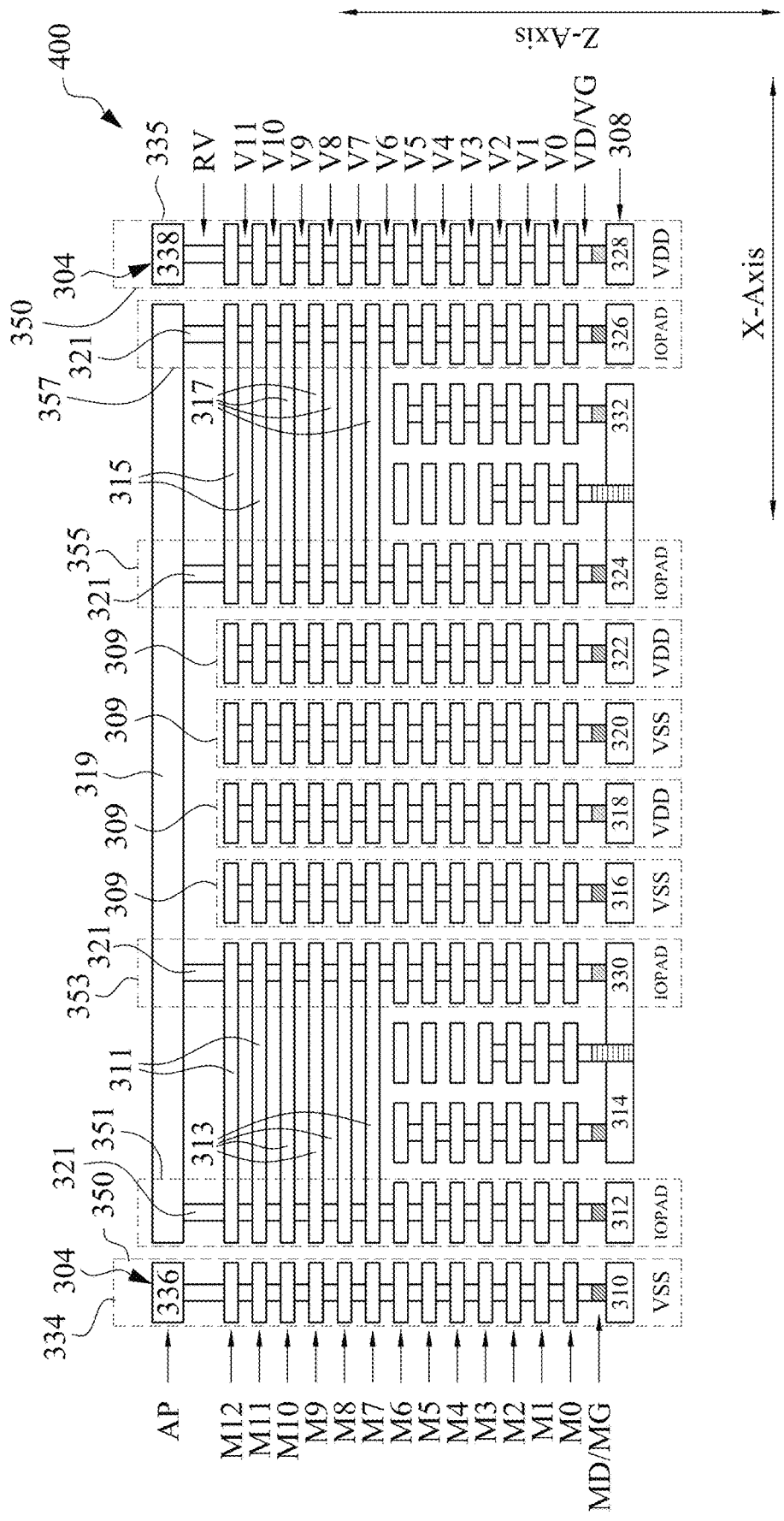
FIG. 4 is a cross sectional view of a layout diagram representing a semiconductor device in accordance with some embodiments.

FIG. 4 is a cross sectional view of a layout diagram 400 representing a semiconductor device in accordance with some embodiments.

A region in a semiconductor device corresponding to layout diagram 400 is an example of region 104 in FIG. 1. Non-BPG-architecture layout diagram 400 includes the components discussed above in the semiconductor substrate 308 and on the non-buried side of the semiconductor substrate 308. More specifically, layout diagram 400 includes semiconductor substrate segments 310, 312, 314, 316, 318, 320, 322, 324, 326, 328, including protected circuits 330, 332, discussed above with respect to FIG. 1. Furthermore, layout diagram 400 includes the components in metallization layers MD/MG, M0-M12, redistribution layer RV, and pad layer AP. Additionally, layout diagram 400 includes the via or via bars in interconnection layers V0-V11.

Accordingly, layout diagram 400 includes supra-SS via towers 309, 334, 335, 351, 353, 355, 357. Furthermore, layout diagram 400 includes conductors 311, 313, 315, 317, 319, 336, 338. Finally, layout diagram 400 includes the vias (or via bars) 321. Accordingly, layout diagram 400 includes non-BPG 304 and guard ring 350 is provided by supra-SS via towers 334, 335.

However, the sub-SS portions of layout diagram 300 in FIG. 4 have been removed from layout diagram 400 shown in FIG. 4 since the non-BPG design is assumed to have been selected. Thus, layout diagram 400 does not include buried metallization layers BM0-BM5 and buried pad layer BAP. As such, layout diagram 400 does not include the sub-SS via tower 331, 340, 342. Furthermore, layout diagram 400 does not include the conductors 329, 359, 361.

Accordingly, guard ring 350 in FIG. 4 does not include BPG 306. Furthermore, unlike layout diagram 300 in FIG. 3, supra-SS via towers 309 are disconnected from one another and from the conductors 313, 317. In some embodiments, first reference voltage, VDD is applied to conductor 338 and second reference voltage VSS is applied to conductor 336. Thus, supra-SS via tower 334 is configured to distribute second reference voltage VDD and supra-SS via tower 335 is configured to distribute first reference voltage VSS. Since supra-SS via towers 309 are disconnected to one another, each of supra-SS via towers 309 can distribute a different reference voltage. In this case, from left to right, reference voltage applied to each of supra-SS via towers 309 alternates. Thus, leftmost supra-SS via tower 309 is biased at the second reference voltage VSS, left middle supra-SS via tower 309 is biased at the first reference voltage VDD, right middle supra-SS via tower 309 is biased at second reference voltage VSS, and rightmost supra-SS via tower 309 is biased at first reference voltage VSS. Furthermore, supra-SS via towers 351, 353, 355, 357 are each used to route input/output signals such that semiconductor substrate segments 312, 326 are configured to receive or output input/output signals that are routed to protected circuits 330, 332. The conductor 311, 313 connect supra-SS via towers 351, 353 and conductors 315, 317 connect supra-SS via towers 355, 357. The conductor 319 connects the conductors 311, 313 to the conductors 315, 317. The supra-SS via towers 309 are thus utilized to distribute power in non-BPG design. Since supra-SS via towers 309 are disconnected from conductors 311, 313, 315, 317, conductors 311, 313, 315, 317 and supra-SS via towers 351, 353, 355, 357 are disconnected from the supra-SS via towers 309.

Figure 5:
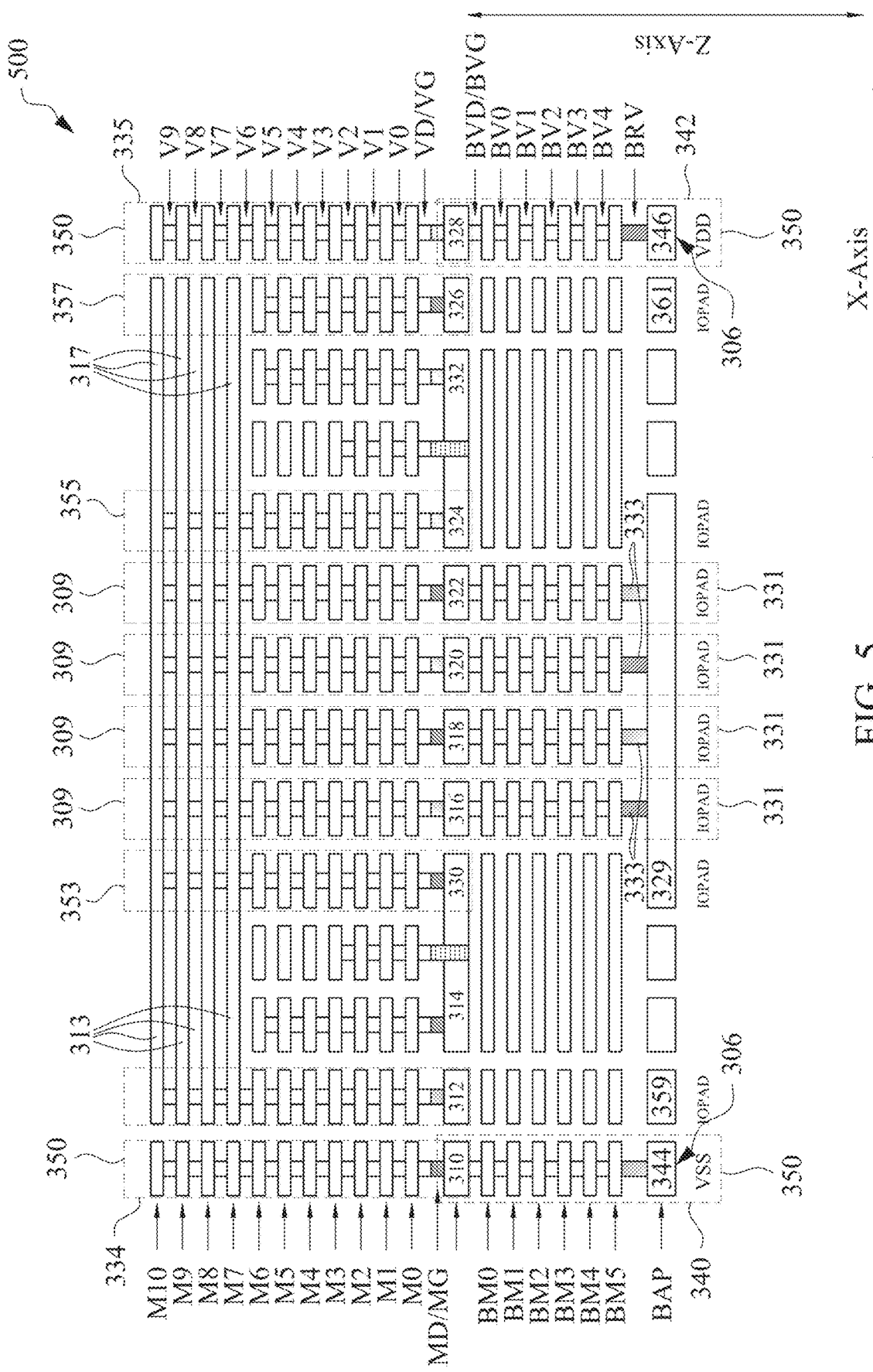
FIG. 5 is a cross sectional view of a layout diagram representing a semiconductor device in accordance with some embodiments.

FIG. 5 is a cross sectional view of a layout diagram 500 representing a semiconductor device in accordance with some embodiments.

A region in a semiconductor device corresponding to layout diagram 500 is an example of region 104 in FIG. 1. Layout diagram 500 includes the semiconductor substrate 308 and components discussed above with respect of FIG. 2, the components being both above and below the semiconductor substrate 308, except that the layout diagram 500 does not include the conductors (conductors 311, 315) in metallization layers M11, M12, vias or via towers in the interconnection layers V10, V11, the vias (or via bars) 321 the redistribution layer RV, and conductors 319, 336, 338 in the pad layer AP. In some embodiments all of the components of the metallization layers M11, M12, interconnection layers V10, V11, the redistribution layer RV, and the pad layer AP are removed from the layout diagram 300 shown in FIG. 2 to provide the layout diagram 500 in FIG. 5.

Furthermore, unlike the layout diagram 400 shown in FIG. 4, supra-SS via towers 309 are preserved as being connected to each other, the leftmost supra-SS via tower 309 remains connected to conductors 313, and the rightmost supra-SS via tower 309 remains connected to the conductors 317.

By preserving the supra-SS via towers 309 as being connected to each other, the leftmost supra-SS via tower 309 remains connected to conductors 313, and the rightmost supra-SS via tower 309 remains connected to conductors 317, via towers 309, 351, 353, 355, 357 and conductors 313, 317 are used to route input/output signals to and from protected circuits 330, 332 in the semiconductor substrate segments 314, 324. As shown in FIG. 5, conductors 329, 359, 361 are each configured as input/output pads that receive and transmit input output signals. Accordingly, in FIG. 4, input/out signals are received and transmitted from sub-SS via towers 331, thru semiconductor substrate segments 316, 318, 320, 322, and to the front side of the layout diagram 500 thru supra-SS via towers 309. As such, unlike the layout diagram 400 shown in FIG. 4, in FIG. 5, the supra-SS via towers 309 are used for input/output signal routing rather than for power distribution.

Additionally, in FIG. 5, conductors 344, 346 remain in layout diagram 500 but the conductors 336, 338 have been removed. As such, layout diagram 500 includes the BPG 306 but not the non-BPG 304. In this example, conductor 346 is configured to receive the first reference voltage VDD. As such, sub-SS via tower 342 and supra-SS via tower 335 are configured to distribute the first reference voltage VDD. Furthermore, conductor 344 is configured to receive the second reference voltage VSS. As such, sub-SS via tower 340 and supra-SS via tower 334 are configured to distribute the second reference voltage VSS. Finally, in layout diagram 500, guard ring 350 is provided by sub-SS via towers 340, 342.

Figure 6:
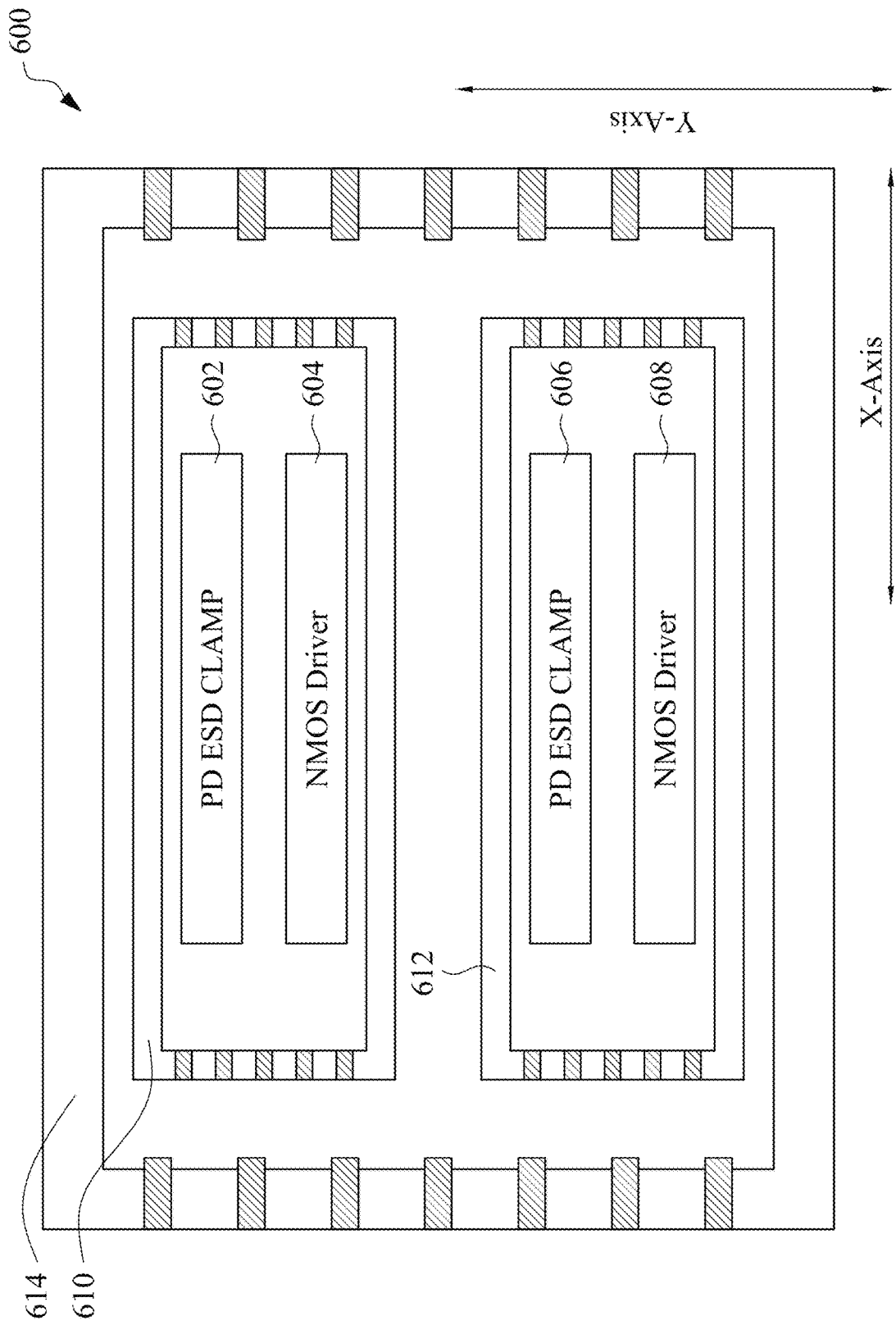
FIG. 6 is a block diagram of a semiconductor device in accordance with some embodiments.

FIG. 6 is a block diagram of a semiconductor device 600, in accordance with some embodiments.

Semiconductor device 600 is an example of region 104 in FIG. 1. The semiconductor device 600 includes protected circuits 602, 604, 606, 608. Protected circuits 602, 604, 606, 608 are aligned with respect to the X-axis and displaced with respect to the Y-axis. Protected circuit 602 is provided in a region having a long axis that extends a first direction parallel to the X-axis and a short axis that extends in a second direction parallel to the Y-axis. In some embodiments, protected circuit 602 is an array of PD ESD clamp circuits. In other embodiments, protected circuit 602 is an array of PU ESD clamp circuits. Protected circuit 604 is provided in a region having a long axis that extends a first direction parallel to the X-axis and a short axis that extends in a second direction parallel to the Y-axis. In some embodiments, protected circuit 604 is an array of NMOS drivers. In other embodiments, protected circuit 604 is an array of PMOS drivers. Protected circuit 606 is provided in a region having a long axis that extends a first direction parallel to the X-axis and a short axis that extends in a second direction parallel to the Y-axis. In some embodiments, protected circuit 606 is an array of PD ESD clamp circuits. In other embodiments, protected circuit 606 is an array of PU ESD clamp circuits. Protected circuit 608 is provided in a region having a long axis that extends a first direction parallel to the X-axis and a short axis that extends in a second direction parallel to the Y-axis. In some embodiments, protected circuit 608 is an array of NMOS drivers. In other embodiments, protected circuit 608 is an array of PMOS drivers. In FIG. 6, all of the long axes of protected circuits 602, 604, 606, 608 are the same length and all of the short axes of protected circuits 602, 604, 606, 608 are the same length. In other embodiments, one or more of the long axes of protected circuits 602, 604, 606, 608 are the different lengths and/or all of the short axes of protected circuits 602, 604, 606, 608 are the different lengths. Protected circuit 602 is topmost protected circuit with respect to Y-axis, protected circuit 604 below protected circuit 602 and above protected circuit 606, protected circuit 606 is below protected circuit 604 and above protected circuit 608, and protected circuit 608 is below protected circuit 606 and is the bottommost protected circuit with respect to the Y-axis.

In FIG. 6, semiconductor device 600 includes a guard ring 610 around protected circuits 602, 604. Guard ring 610 is configured to be biased at the second reference voltage VSS. In some embodiments, guard ring 610 is continuous and goes entirely around protected circuits 602, 604 in an entirely closed loop. In other embodiments, guard ring 610 includes discontinuities such as one or more gaps. Guard ring 610 is rectangular with long sides parallel to the X-axis and short sides parallel to the Y-axis. In other embodiments, guard ring 610 is provided in another shape such as circular, elliptical, trapezoidal, triangular, the shape of another polygon, an irregular shape, and/or the like.

In FIG. 6, semiconductor device 600 includes a guard ring 612 around protected circuits 606, 608. Guard ring 612 is configured to be biased at the second reference voltage VSS. In some embodiments, guard ring 612 is continuous and goes entirely around protected circuits 606, 608 in an entirely closed loop. In other embodiments, guard ring 612 includes discontinuities such as one or more gaps. Guard ring 612 is rectangular with long sides parallel to the X-axis and short sides parallel to the Y-axis. In other embodiments, guard ring 612 is provided in another shape such as circular, elliptical, trapezoidal, triangular, the shape of another polygon, an irregular shape, and/or the like.

In FIG. 6, semiconductor device 600 further includes a guard ring 614 around guard rings 610, 612 and thus also around protected circuits 602, 604, 606, 608. Guard ring 614 is configured to be biased at the first reference voltage VDD. In some embodiments, guard ring 614 is continuous and goes entirely around guard rings 610, 612 in an entirely closed loop. In other embodiments, guard ring 614 includes discontinuities such as one or more gaps. Guard ring 614 is rectangular with long sides parallel to the X-axis and short sides parallel to the Y-axis. In other embodiments, guard ring 614 is provided in another shape such as circular, elliptical, trapezoidal, triangular, the shape of another polygon, an irregular shape, and/or the like.

Protected circuits 602, 604 correspond to protected circuits 330, 332 in FIGS. 3, 4, 5 and protected circuits 606, 608 also correspond to protected circuits 330, 332 in FIGS. 3, 4, 5. Guard ring 610 corresponds to guard ring 350 in FIGS. 3, 4, 5 and guard ring 612 also corresponds to guard ring 350 in FIGS. 3, 4, 5. In some embodiments, guard ring 614 has a structure similar to guard ring 350 in FIGS. 3, 4, 5. Thus, in some embodiments, guard rings 610, 612, 614 are provided with non-BPG 304, like in FIG. 4, or are provided with the BPG 306 shown in FIG. 5. Layout diagram 300 in FIG. 3 allows for the selection of either arrangement.

Figure 7:
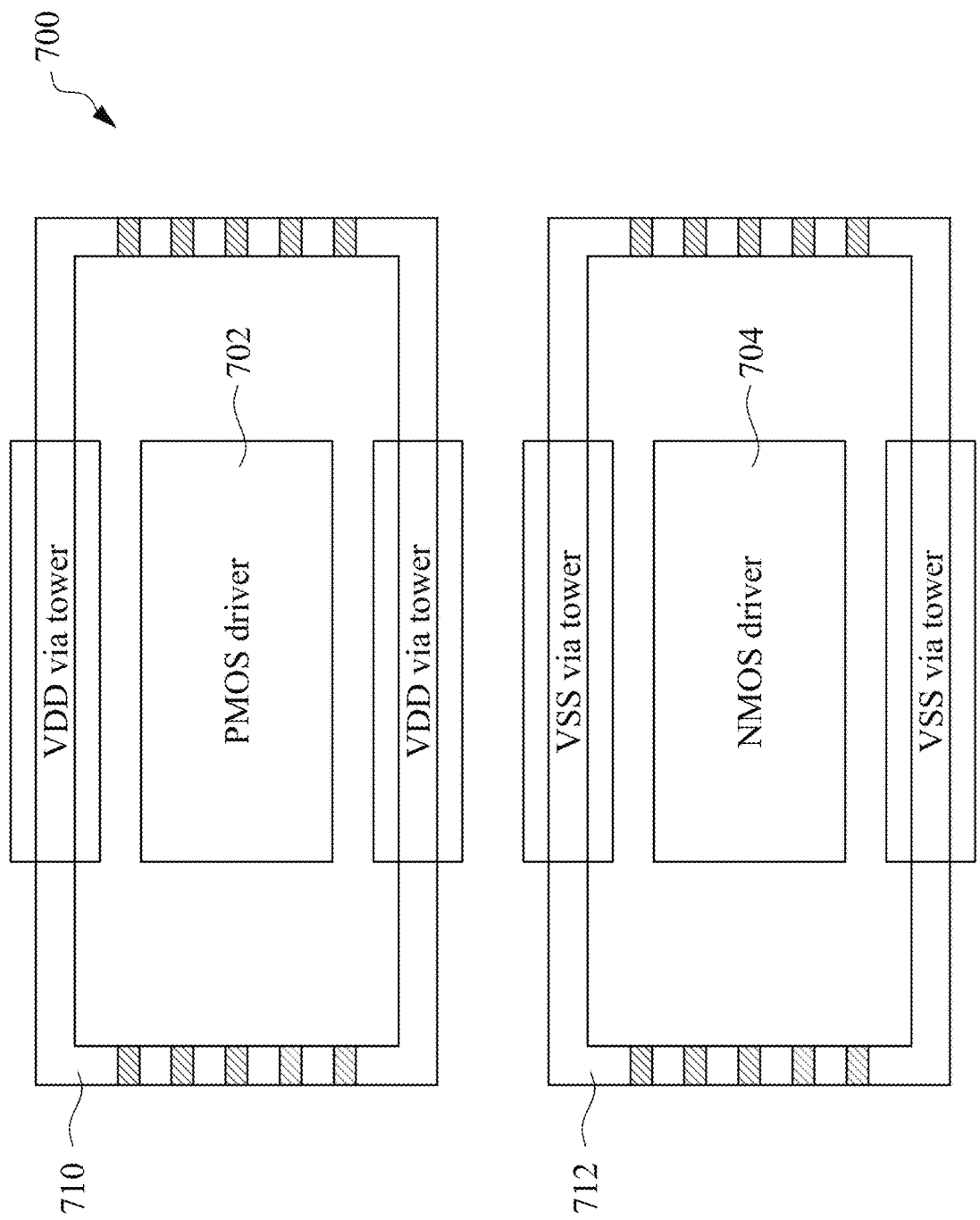
FIG. 7 is a block diagram of a semiconductor device in accordance with some embodiments.

FIG. 7 is a block diagram of a semiconductor device 700 in accordance with some embodiments.

Semiconductor device 700 is an example of region 104 in FIG. 1. Semiconductor device 700 includes protected circuits 702, 704. Each of protected circuits 702, 704 is aligned with respect to the X-axis and displaced with respect to the Y-axis. Protected circuit 702 is provided in a region having a long axis that extends a first direction parallel to the X-axis and a short axis that extends in a second direction parallel to the Y-axis. In some embodiments, protected circuit 702 is an array of PMOS drivers. In other embodiments, protected circuit 704 is an array of NMOS drivers. In FIG. 7, both of the long axes of protected circuits 702, 704, are the same length and all of the short axes of protected circuits 702, 704, are the same length. In other embodiments, one or more of the long axes of protected circuits 702, 704, are the different lengths and/or all of the short axes of protected circuits 702, 704, are the different lengths. Protected circuit 702 is topmost protected circuit with respect to Y-axis and protected circuit 704 is below protected circuit 702 and is the bottommost protected circuit with respect to the Y-axis.

Semiconductor device 700 includes a guard ring 710 around protected circuit 702. Guard ring 710 is configured to be biased at the first reference voltage VDD. In some embodiments, guard ring 710 is continuous and goes entirely around protected circuit 704 in an entirely closed loop. In other embodiments, guard ring 710 includes discontinuities such as one or more gaps. Guard ring 710 is rectangular with long sides parallel to the X-axis and short sides parallel to the Y-axis. In other embodiments, guard ring 710 is provided in another shape such as circular, elliptical, trapezoidal, triangular, the shape of another polygon, an irregular shape, and/or the like.

Semiconductor device 700 includes a guard ring 712 around protected circuits 704. Guard ring 712 is configured to be biased at the second reference voltage VSS. In some embodiments, guard ring 712 is continuous and goes entirely around protected circuits 706, 708 in an entirely closed loop. In other embodiments, guard ring 712 includes discontinuities such as one or more gaps. Guard ring 712 is rectangular with long sides parallel to the X-axis and short sides parallel to the Y-axis. In other embodiments, guard ring 712 is provided in another shape such as circular, elliptical, trapezoidal, triangular, the shape of another polygon, an irregular shape, and/or the like.

Protected circuits 702, 704 each correspond to one of the protected circuits 330, 332 in FIGS. 3, 4, 5, guard ring 710 corresponds to guard ring 350 in FIGS. 3, 4, 5 and guard ring 712 also corresponds to guard ring 350 in FIGS. 3, 4, 5. In some embodiments, guard ring 714 has a structure similar to guard ring 350 in FIGS. 3, 4, 5. Thus, in some embodiments, guard rings 710, 712, 714 are provided with non-BPG 304, like in FIG. 4, or are provided with the BPG 306 shown in FIG. 5. Layout diagram 300 in FIG. 3 allows for the selection of either arrangement.

Figure 8:
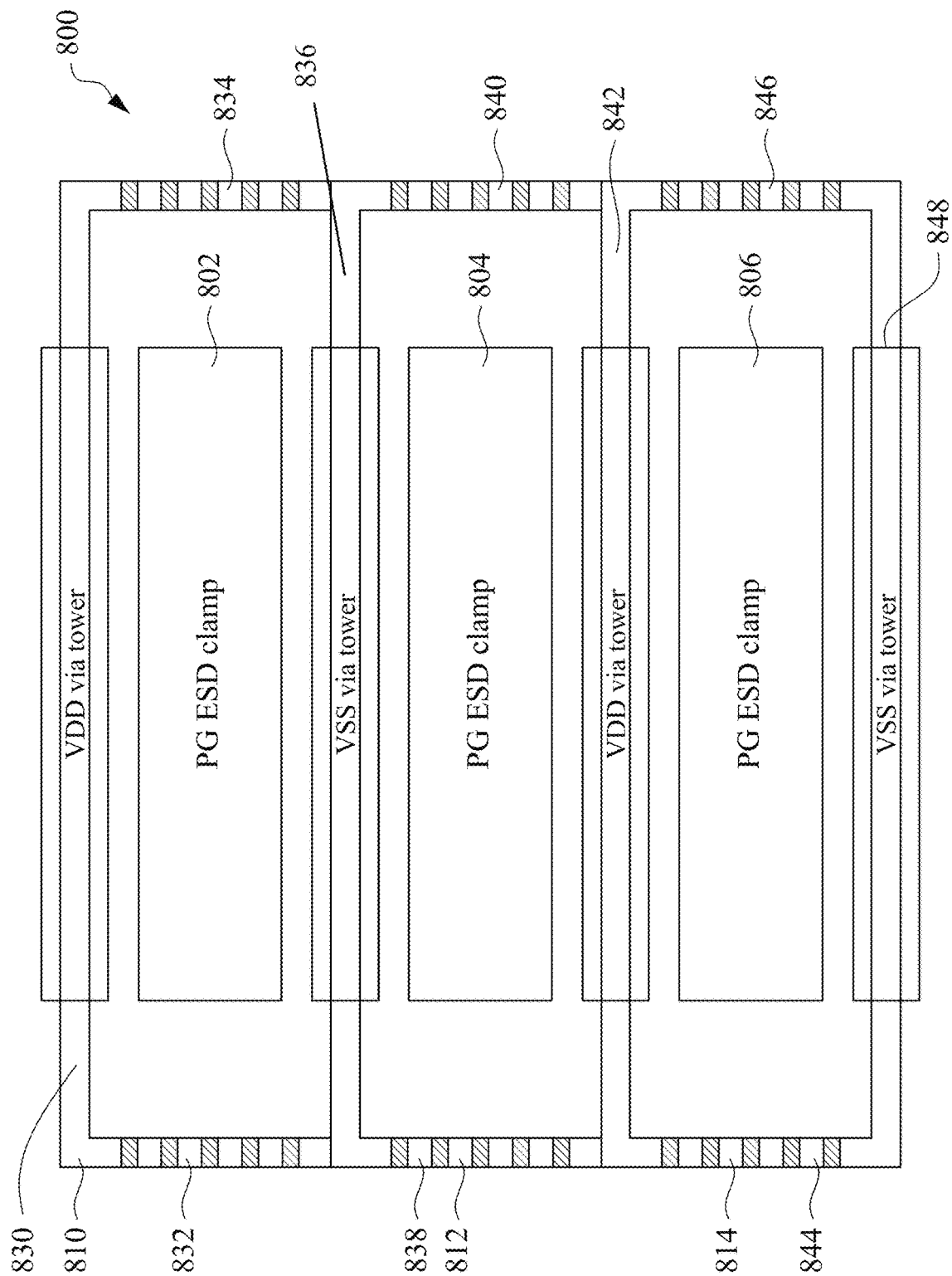
FIG. 8 is a block diagram of a semiconductor device in accordance with some embodiments.

FIG. 8 is a block diagram of a semiconductor device 800 in accordance with some embodiments.

Semiconductor device 800 is an example of region 104 in FIG. 1. Semiconductor device 800 includes protected circuits 802, 804. Protected circuits 802, 804, 806 are aligned with respect to the X-axis and displaced with respect to the Y-axis. Protected circuit 802 is provided in a region having a long axis that extends a first direction parallel to the X-axis and a short axis that extends in a second direction parallel to the Y-axis. In some embodiments, protected circuit 802 is an array of power grid (PG) ESD clamp circuits. In other embodiments, protected circuit 804 is an array of PG ESD clamp circuits. Additionally, protected circuit 806 is an array of PG ESD clamp circuits. In FIG. 8, all of the long axes of protected circuits 802, 804, 806 are the same length and all of the short axes of protected circuits 802, 804, 806 are the same length. In other embodiments, one or more of the long axes of protected circuits 802, 804, 806 are the different lengths and/or all of the short axes of protected circuits 802, 804, 806 are the different lengths. protected circuit 802 is topmost protected circuit with respect to Y-axis, protected circuit 804 is below protected circuit 802 and above protected circuit 806, and protected circuit 806 is below protected circuit 804 and is the bottommost protected circuit with respect to the Y-axis.

Semiconductor device 800 includes a guard ring 810 around protected circuit 802. Guard ring 810 has walls 830, 832, 834 configured to be biased by the first reference voltage VDD and a wall 836 configured to be biased by the second reference voltage VSS. In some embodiments, guard ring 810 is continuous and goes entirely around protected circuit 802 in an entirely closed loop. In other embodiments, guard ring 810 includes discontinuities such as one or more gaps. In FIG. 8, guard ring 810 is rectangular with walls 830, 836 each having long axis parallel to the X-axis and walls 832, 834 extending parallel to the Y-axis. In other embodiments, guard ring 810 is provided in another shape such as circular, elliptical, trapezoidal, triangular, the shape of another polygon, an irregular shape, and/or the like. In some embodiments, sections of guard ring 810 in these other shapes are provided as walls with at different reference voltages.

Semiconductor device 800 further includes a guard ring 812 around protected circuit 802. Guard ring 812 has walls 836 (shared with guard ring 810), 838, 840 configured to be biased by the second reference voltage VSS and a wall 842 configured to be biased by the first reference voltage VDD. In some embodiments, guard ring 812 is continuous and goes entirely around protected circuit 804 in an entirely closed loop. In other embodiments, guard ring 812 includes discontinuities such as one or more gaps. Guard ring 812 is rectangular with walls 836, 840 each having long axis parallel to the X-axis and walls 838, 840 extending parallel to the Y-axis. In other embodiments, guard ring 812 is provided in another shape such as circular, elliptical, trapezoidal, triangular, the shape of another polygon, an irregular shape, and/or the like. In some embodiments, sections of guard ring 812 in these other shapes are provided as walls with different reference voltages.

Semiconductor device 800 further includes a guard ring 814 around protected circuit 806. Guard ring 814 has walls 842 (shared with guard ring 812), 844, 846 configured to be biased by the first reference voltage VDD and a wall 848 configured to be biased by the second reference voltage VSS. In some embodiments, guard ring 814 is continuous and goes entirely around protected circuit 806 in an entirely closed loop. In other embodiments, guard ring 814 includes discontinuities such as one or more gaps. Guard ring 814 is rectangular with walls 840, 846 each having long axis parallel to the X-axis and walls 842, 844 extending parallel to the Y-axis. In other embodiments, guard ring 814 is provided in another shape such as circular, elliptical, trapezoidal, triangular, the shape of another polygon, an irregular shape, and/or the like. In some embodiments, sections of guard ring 812 in these other shapes are provided as walls with different reference voltages.

Protected circuits 802, 804, 806 each correspond to one of protected circuits 330, 332 in FIGS. 3, 4, 5, guard ring 810 corresponds to guard ring 350 in FIGS. 3, 4, 5, guard ring 812 also corresponds to guard ring 350 in FIGS. 3, 4, 5, and guard ring 814 also corresponds to guard ring 350 in FIGS. 3, 4, 5. Thus, in some embodiments, guard rings 810, 812, 814 are provided with non-BPG 304, like in FIG. 4, or are provided with the BPG 306 shown in FIG. 5. Layout diagram 300 in FIG. 3 allows for the selection of either arrangement.

Figure 9:
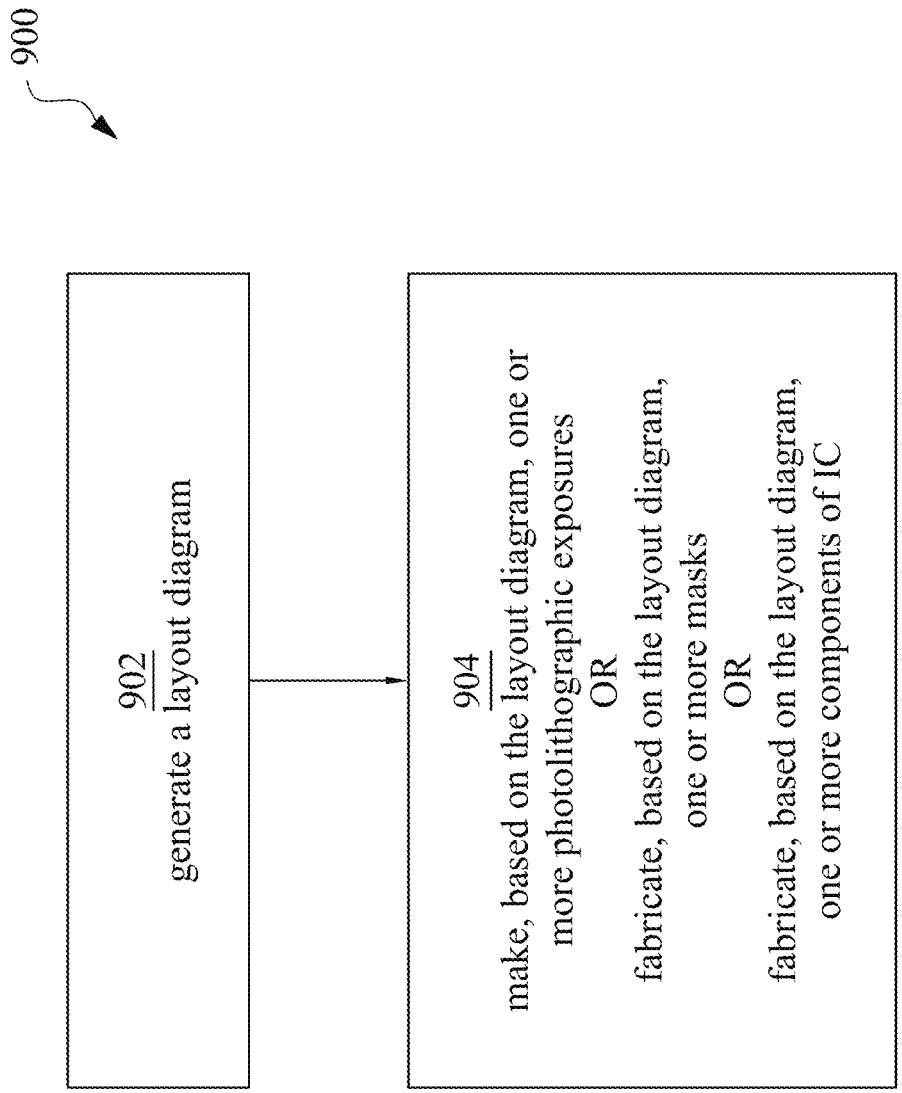
FIG. 9 is a flowchart of a method of manufacturing a semiconductor device, in accordance with some embodiments.

FIG. 9 is a flowchart of a method 900 of manufacturing a semiconductor device, in accordance with some embodiments.

Method 900 is implementable, for example, using EDA system 1100 (FIG. 11, discussed below) and an integrated circuit (IC), manufacturing system 1200 (FIG. 12, discussed below), in accordance with some embodiments. Examples of a semiconductor device which can be manufactured according to method 900 include semiconductor device 110 FIG. 1.

In FIG. 9, method 900 includes blocks 902-904. At block 902, a layout diagram is generated which, among other things, includes one or more of layout diagrams disclosed herein, or the like. Block 902 is implementable, for example, using EDA system 1100 (FIG. 11, discussed below), in accordance with some embodiments. From block 902, flow proceeds to block 904.

At block 904, based on the layout diagram, at least one of (A) one or more photolithographic exposures are made or (B) one or more semiconductor masks are fabricated or (C) one or more components in a layer of a semiconductor device are fabricated. See discussion below of FIG. 12.

Figure 10A:
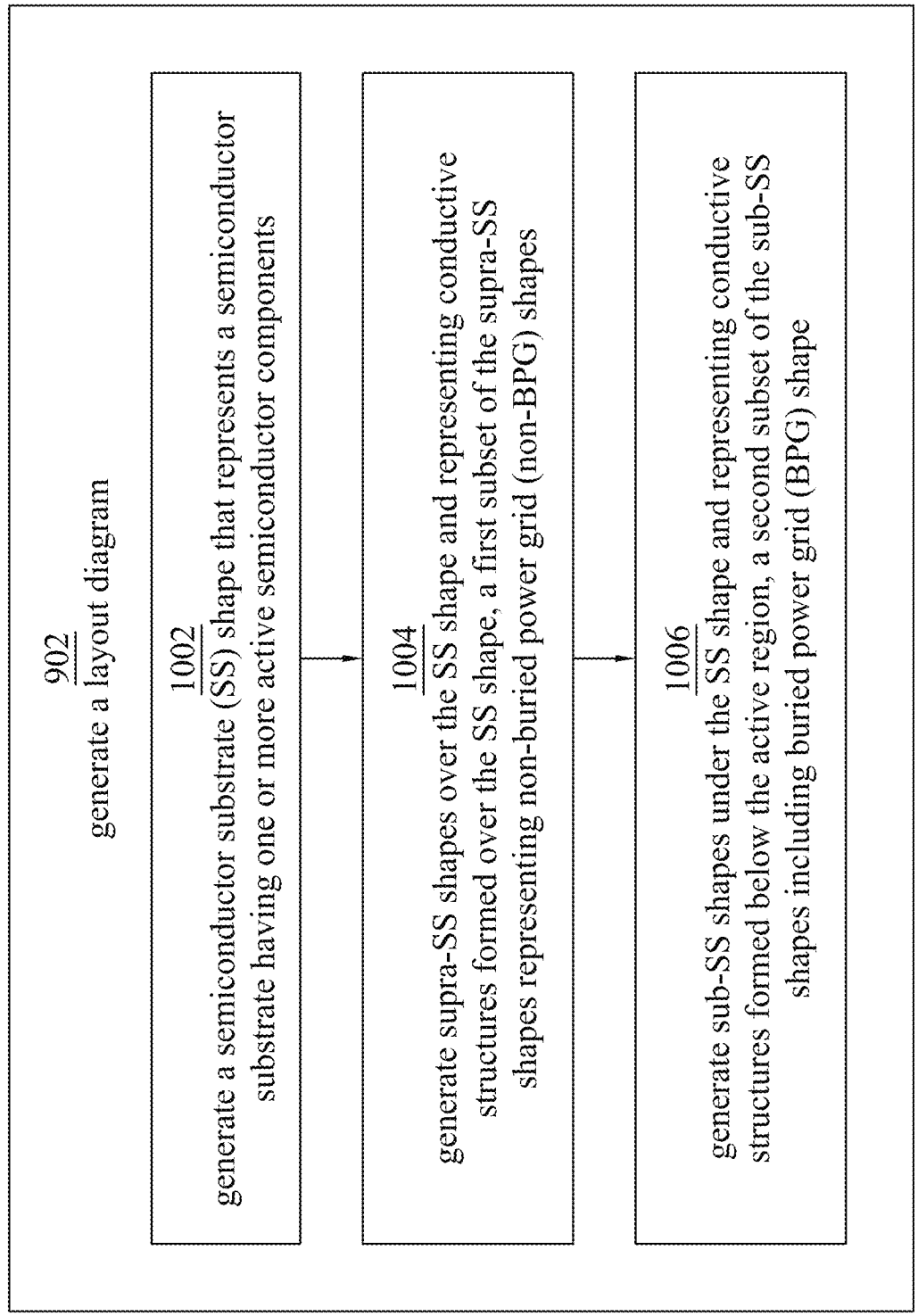
FIG. 10A is a flowchart of a method of generating a layout diagram, in accordance with some embodiments.

FIG. 10A is a flowchart of a method 1000 of generating a layout diagram, in accordance with some embodiments.

In FIG. 10A, the flowchart is one embodiment of performing block 902 above. In FIG. 10A, block 902 includes blocks 1002-1006. At block, 1002, a semiconductor substrate (SS) shape that represents a semiconductor substrate having one or more active semiconductor components is generated. An example of the semiconductor substrate represented by the SS shape is semiconductor substrate 308, or the like, wherein semiconductor substrate 308 includes protected circuits 330, 332 which have active semiconductor components, such as transistors or diodes. From block 1002, flow proceeds to block 1004.

At block 1004, supra-SS shapes over the SS shape and representing conductive structures formed over the semiconductor substrate (supra-SS conductive structures) are generated, wherein a subset of the supra-SS shapes includes non-buried power grid (non-BPG) shapes which represent corresponding non-BPG conductive structures. Examples of the supra-SS conductive structures represented by the supra-SS shapes include the contacts in metallization layers MD/MG, the vias or via bars in interconnection layers V0-V11, the conductors (including conductors 311, 313, 315, 317) in the metallization layers M0-M12, the via or via bars (including via/via bars 321) in the redistribution layer RV, and conductors 319, 336, 338 in the pad layer AP, which are all shown in FIG. 3, or the like. Accordingly, the non-BPG shape is a shape that represents non-BPG 304 in FIG. 3. From block 1004, flow proceeds to block 1006.

At block 1006, sub-SS shapes under the SS shape and representing conductive structures formed below the SS shape (sub-SS conductive structures) are generated, wherein a subset of the sub-SS shapes includes BPG shapes which represent corresponding BPG conductive structures. Examples of the sub-SS conductive structures represented by the sub-SS shapes include vias or via bars in interconnection layer BVD/BVG, vias or via towers in interconnection layers BV0-BV11, the conductors in the metallization layers BM0-BM5, the via or via bars in the redistribution layer RV, and the conductors (including conductors 329, 346, 344, 359, 361) in the pad layer BAP, which are shown in FIG. 3, or the like. From block 1006, flow proceeds to block 1008.

At block 1008, a first group of corresponding portions of the SS shape are configured to represent a first protected circuit. Examples of the first protected circuit represented by the first group include protected circuit 330 or protected circuit 332 in FIG. 3, protected circuits 602, 604, 606, or 608 in FIG. 6, protected circuit 702 or 704 in FIG. 7, and protected circuits 802, 804, 806 in FIG. 8, or the like. From block 1008, flow proceeds to block 1010.

At block 1010, a second group of corresponding portions of the SS shape, corresponding ones of the supra-SS shapes including the non-BPG shapes, and corresponding ones of the sub-SS shapes including the BPG shapes are configured to represent a first guard ring around the first protected circuit. Examples of first guard ring represented by the second group include guard ring 350, guard rings 610, 612, 614 in FIG. 6, guard ring 710, 712 in FIG. 7, and guard rings 812, 814 in FIG. 8, or the like.

Figure 10B:
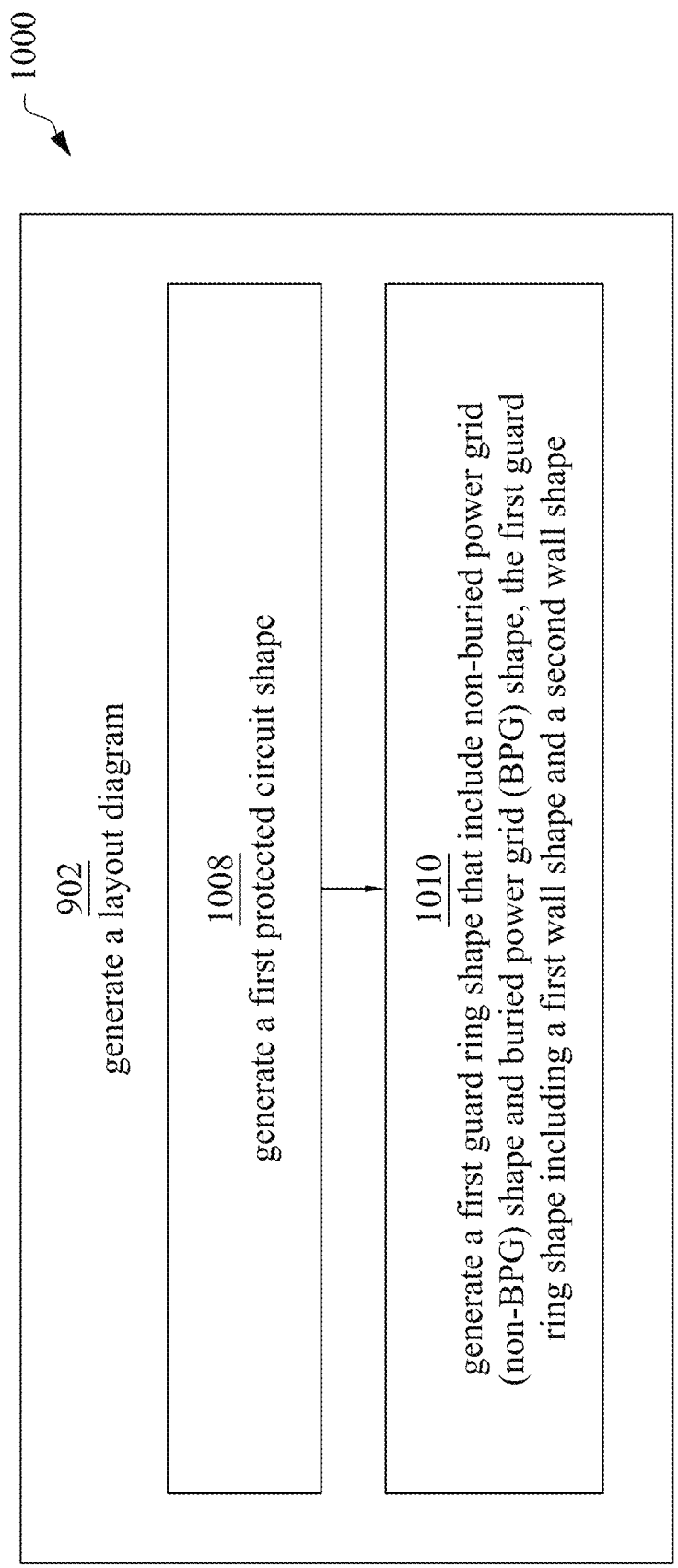
FIG. 10B is a flowchart of a method of generating a layout diagram, in accordance with some embodiments.

FIG. 10B is a flowchart of a method of generating a layout diagram, in accordance with some embodiments.

In FIG. 10B, the flowchart is one embodiment of performing block 902 above. In FIG. 10B, block 902 includes blocks 1008-1010. At block, 1008, shapes representing a first guard ring shape that includes non-buried power grid (non-BPG) shapes and buried power grid (BPG) shapes are generated. An example of the first guard ring shape are shapes representing guard ring 810, 812, or 814 in FIG. 8. An example of the non-BPG shape is non-BPG 304 in FIG. 3. An example of the BPG shape is BPG 306 in FIG. 3. From block 1008, flow proceeds to block 1010.

At block 1010, first protected shapes interior to a perimeter formed by the first guard ring shape are generated, the first protected shapes representing at least a first protected circuit. Additionally, the first guard ring shapes include first wall shapes and second wall shapes, the first wall shapes represent a first wall configured to receive a first reference voltage, and the second wall shapes represent a second wall configured to receive a second reference voltage. An example of the first wall shape is a shape representing walls 830, 832, or 834 with respect to guard ring 810 in FIG. 8, walls 836, 838, or 840 with respect to guard ring 812 in FIG. 8, and walls 842, 844, or 846 with respect to guard ring 814 in FIG. 8. An example of the second wall shape is a shape representing wall 836 with respect to guard ring 810, wall 842 with respect to guard ring 812, and wall 848 with respect to guard ring 814. Examples of protected shapes include shapes representing protected circuits 330, 332 in FIG. 3, which have active semiconductor components, such as transistors or diodes.

Figure 10C:
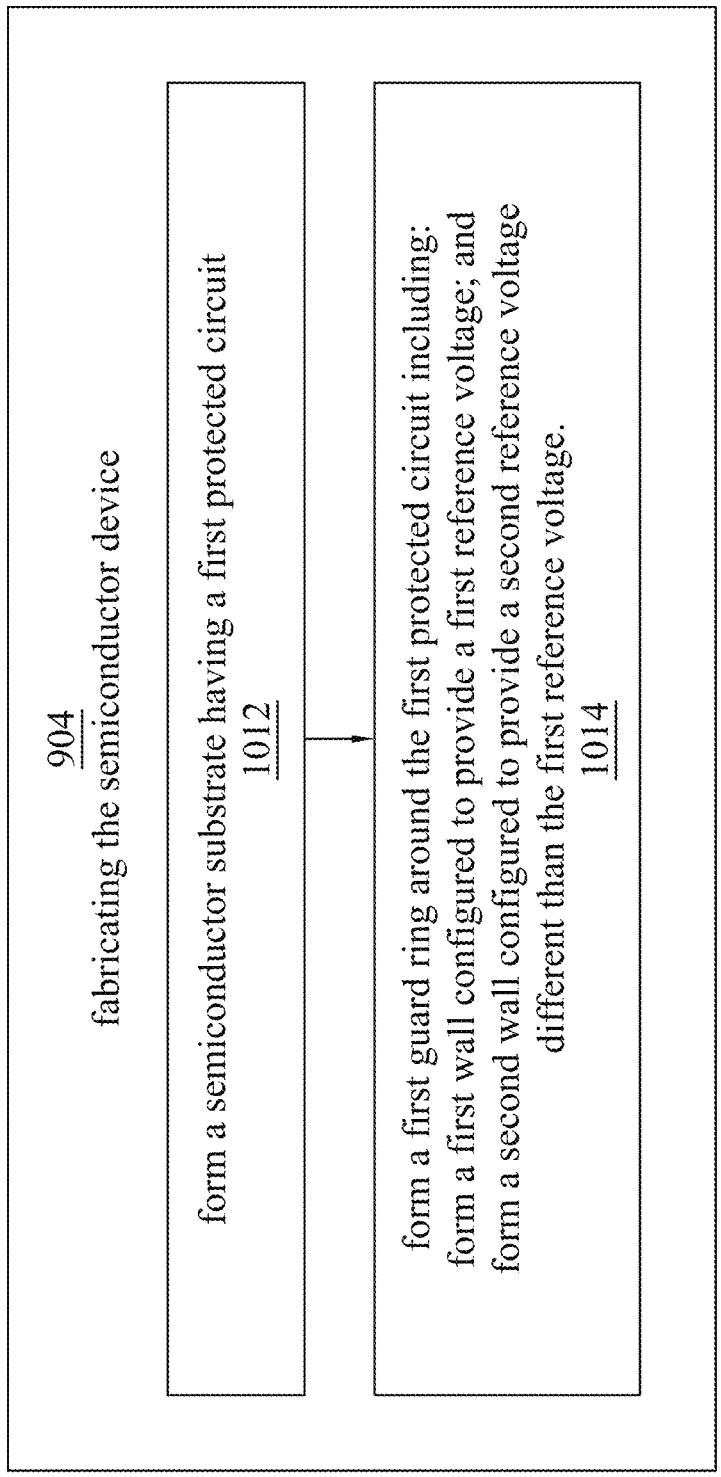
FIG. 10C is a flowchart of a method of fabricating a semiconductor device, in accordance with some embodiments.

FIG. 10C is a flowchart of one method of fabricating a semiconductor device, in accordance with at least some embodiments.

In some embodiments, the flowchart is one embodiment of implementing block 904 in FIG. 9. FIG. 10C includes blocks 1012-1014. At block 1012, a semiconductor substrate having a first protected circuit is formed. An example of the semiconductor substrate is the semiconductor substrate 308 in FIG. 3. Examples of the first protected circuits include protected circuits 330, 332 in FIG. 3, or the like, which have active semiconductor components, such as transistors or diodes. From block 1012, proceeds to block 1014.

At block 1014, a first guard ring around the first protected circuit is formed including: forming a first wall configured to provide a first reference voltage; and forming a second wall configured to provide a second reference voltage different than the first reference voltage. An example of the first guard ring is the guard ring 810. An example of the first wall is wall 830, 832, or 834 in FIG. 8, or the like, and an example of the first reference voltage is reference voltage VDD, or the like. An example of the second wall is wall 836, or the like, and an example of the second reference voltage is the reference voltage VSS, or the like.

In some embodiments, the forming a first guard ring further includes forming at least a third wall configured to provide the first reference voltage. In some embodiments in which an example of the first wall is wall 830, an example of the third wall is wall 832 or wall 834, or the like.

In some embodiments, the method of FIG. 10C further includes forming a buried power grid (BPG) beneath the semiconductor substrate, and the forming a first guard ring includes incorporating a portion of the BPG into the first guard ring. An example of a portion of the BPG being incorporated into the first guard ring is conductor 344 in sub-SS via tower 340, conductor 346 in sub-SS via tower 342, or the like.

In some embodiments, the method of FIG. 10C further includes forming a non-buried power grid (non-BPG) above the semiconductor substrate, and the forming a first guard ring includes incorporating a portion of the non-BPG into the first guard ring. An example of a portion of the non-BPG being incorporated into the first guard ring is conductor 336 in supra-SS via tower 334, conductor 348 in supra-SS via tower 335, or the like.

In some embodiments, the method of FIG. 10C further includes forming a second protected circuit; and the forming a first guard ring further includes disposing the first guard ring around the second protected circuit. In some embodiments in which an example of the first guard ring is guard ring 614, or the like, and an example of a second guard ring formed inside the first guard ring is guard ring 610, guard ring 612, or the like.

Figure 10D:
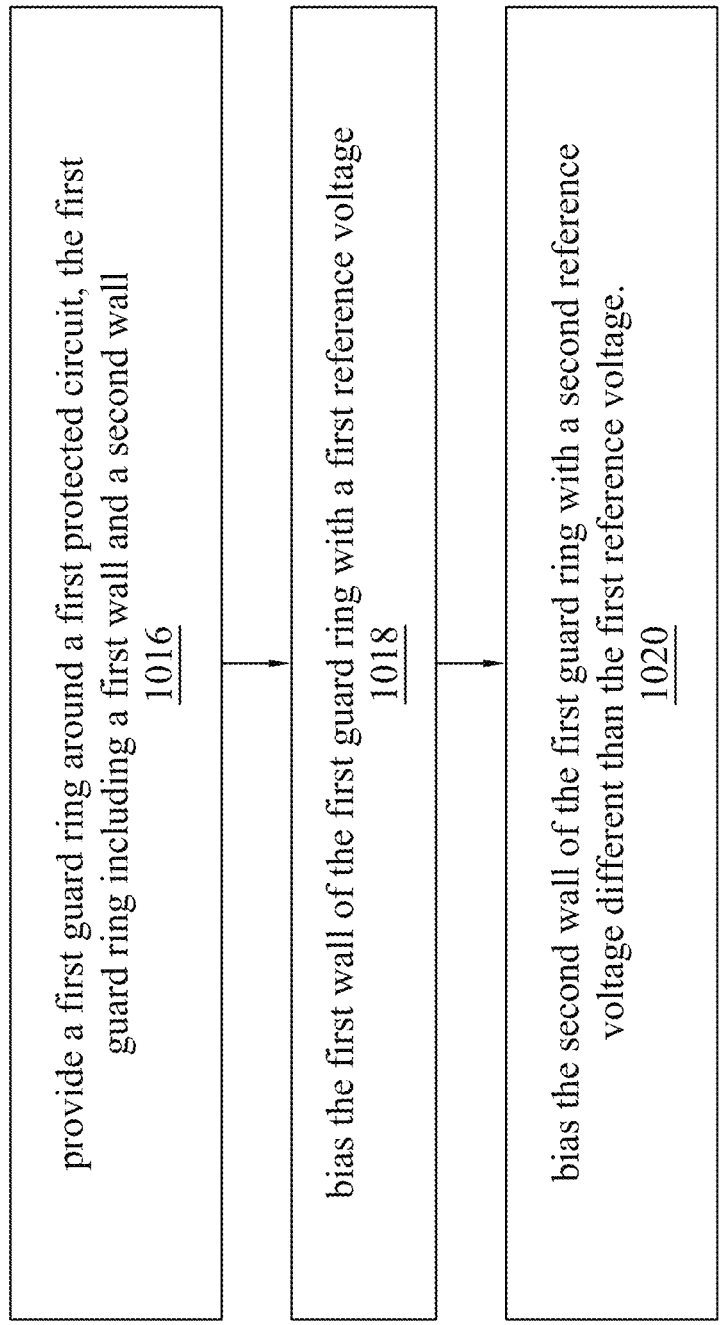
FIG. 10D is a flowchart of operating a semiconductor device, in accordance with some embodiments.

FIG. 10D is a flowchart of one method of operating a semiconductor device, in accordance with at least some embodiments.

FIG. 10D includes blocks 1016-1020. At block 1016, a first guard ring around a first protected circuit is provided, the first guard ring including a first wall and a second wall. An example of the first protected circuit is protected circuits 330, 332 in FIG. 3, or the like, which have active semiconductor components, such as transistors or diodes. An example of the first wall is wall 830, wall 832, or wall 834 in FIG. 8, or the like, and an example of the first reference voltage is reference voltage VDD, or the like. An example of the second wall is wall 836, or the like, and an example of the second reference voltage is the reference voltage VSS. From block 1016, flow proceeds to block 1018.

At block 1018, the first wall of the first guard ring is biased with a first reference voltage. An example of the first reference voltage is reference voltage VDD, or the like. From block 1018, flow proceeds to block 1020.

At block 1020, the second wall of the second guard ring is biased with a second reference voltage that is different than the first reference voltage. An example of the second reference voltage is reference voltage VSS, or the like.

Figure 11:
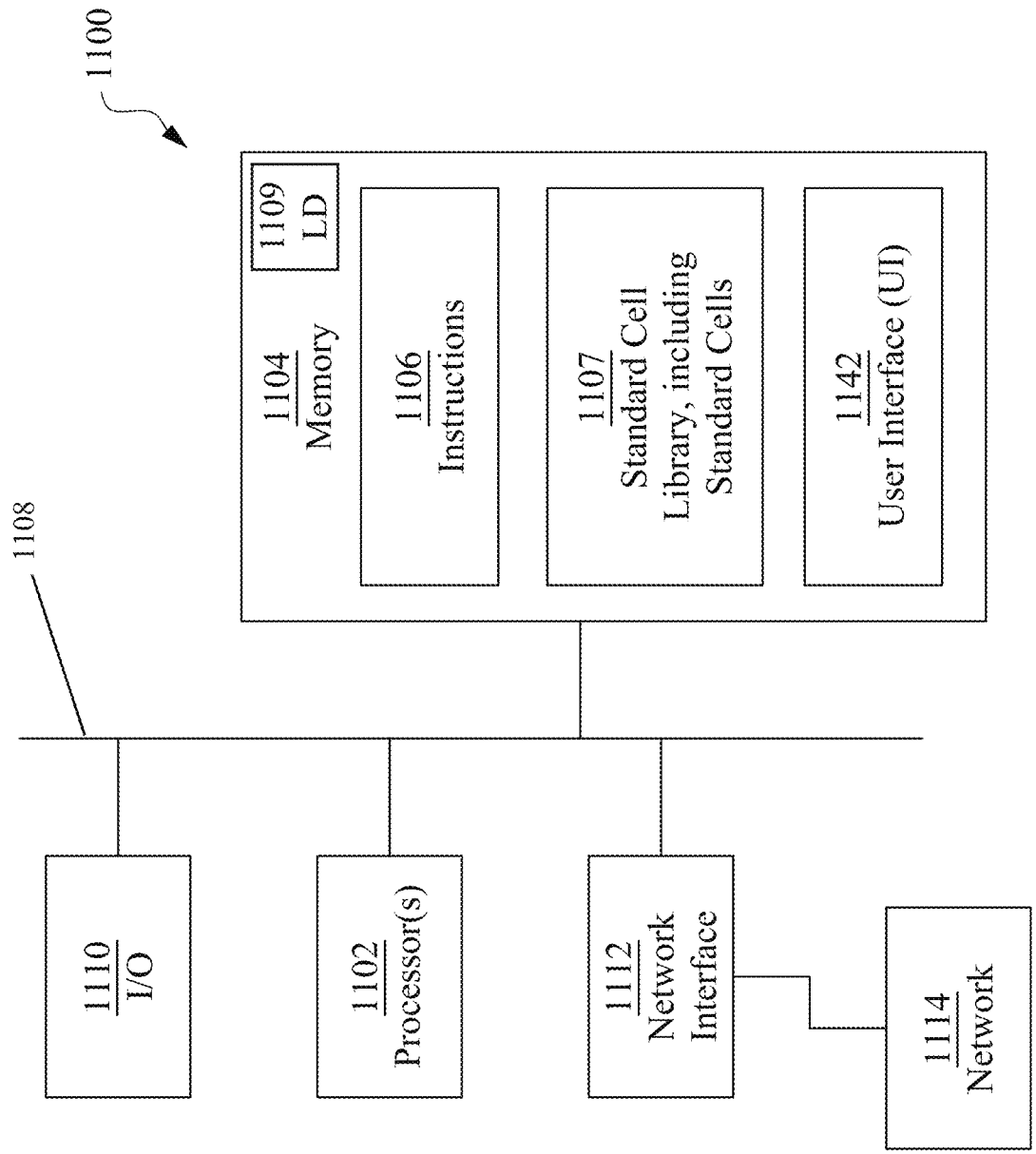
FIG. 11 is a block diagram of an electronic design automation (EDA) system, in accordance with some embodiments.

FIG. 11 is a block diagram of an electronic design automation (EDA) system 1100, in accordance with some embodiments.

In some embodiments, EDA system 1100 includes an APR system. Methods described herein of designing layout diagrams, in accordance with one or more embodiments, are implementable, for example, using EDA system 1100, in accordance with some embodiments.

In some embodiments, EDA system 1100 is a general purpose computing device including a hardware processor 1102 and a non-transitory, computer-readable storage medium 1104. Computer-readable storage medium 1104, amongst other things, is encoded with, i.e., stores, computer program code 1106, i.e., a set of executable instructions. Execution of instructions 1106 by hardware processor 1102 represents (at least in part) an EDA tool which implements a portion or all of the methods described herein in accordance with one or more embodiments (hereinafter, the noted processes and/or methods).

Processor 1102 is electrically coupled to computer-readable storage medium 1104 via a bus 1108. Processor 1102 is also electrically coupled to an I/O interface 1110 by bus 1108. A network interface 1112 is also electrically connected to processor 1102 via bus 1108. Network interface 1112 is connected to a network 1114, so that processor 1102 and computer-readable storage medium 1104 are capable of connecting to external elements via network 1114. Processor 1102 is configured to execute computer program code 1106 encoded in computer-readable storage medium 1104 in order to cause system 1100 to be usable for performing a portion or all of the noted processes and/or methods. In one or more embodiments, processor 1102 is a central processing unit (CPU), a multi-processor, a distributed processing system, an application specific integrated circuit (ASIC), and/or a suitable processing unit.

In one or more embodiments, computer-readable storage medium 1104 is an electronic, magnetic, optical, electromagnetic, infrared, and/or a semiconductor system (or apparatus or device). For example, computer-readable storage medium 1104 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 1104 includes a compact disk-read only memory (CD-ROM), a compact disk-read/write (CD-R/W), and/or a digital video disc (DVD).

In one or more embodiments, computer-readable storage medium 1104 stores computer program code 1106 configured to cause system 1100 (where such execution represents (at least in part) the EDA tool) to be usable for performing a portion or all of the noted processes and/or methods. In one or more embodiments, computer-readable storage medium 1104 also stores information which facilitates performing a portion or all of the noted processes and/or methods. In one or more embodiments, computer-readable storage medium 1104 stores library 1107 of standard cells including such standard cells as disclosed herein. In one or more embodiments, computer-readable storage medium 1104 stores one or more layout diagrams (LD) 1109 corresponding to one or more layouts disclosed herein.

EDA system 1100 includes I/O interface 1110. I/O interface 1110 is coupled to external circuitry. In one or more embodiments, I/O interface 1110 includes a keyboard, keypad, mouse, trackball, trackpad, touchscreen, and/or cursor direction keys for communicating information and commands to processor 1102.

EDA system 1100 also includes network interface 1112 coupled to processor 1102. Network interface 1112 allows system 1100 to communicate with network 1114, to which one or more other computer systems are connected. Network interface 1112 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 1100.

System 1100 is configured to receive information through I/O interface 1110. The information received through I/O interface 1110 includes one or more of instructions, data, design rules, libraries of standard cells, and/or other parameters for processing by processor 1102. The information is transferred to processor 1102 via bus 1108. EDA system 1100 is configured to receive information related to a UI through I/O interface 1110. The information is stored in computer-readable storage medium 1104 as user interface (UI) 1142.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 1100. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer-readable recording medium. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 12:
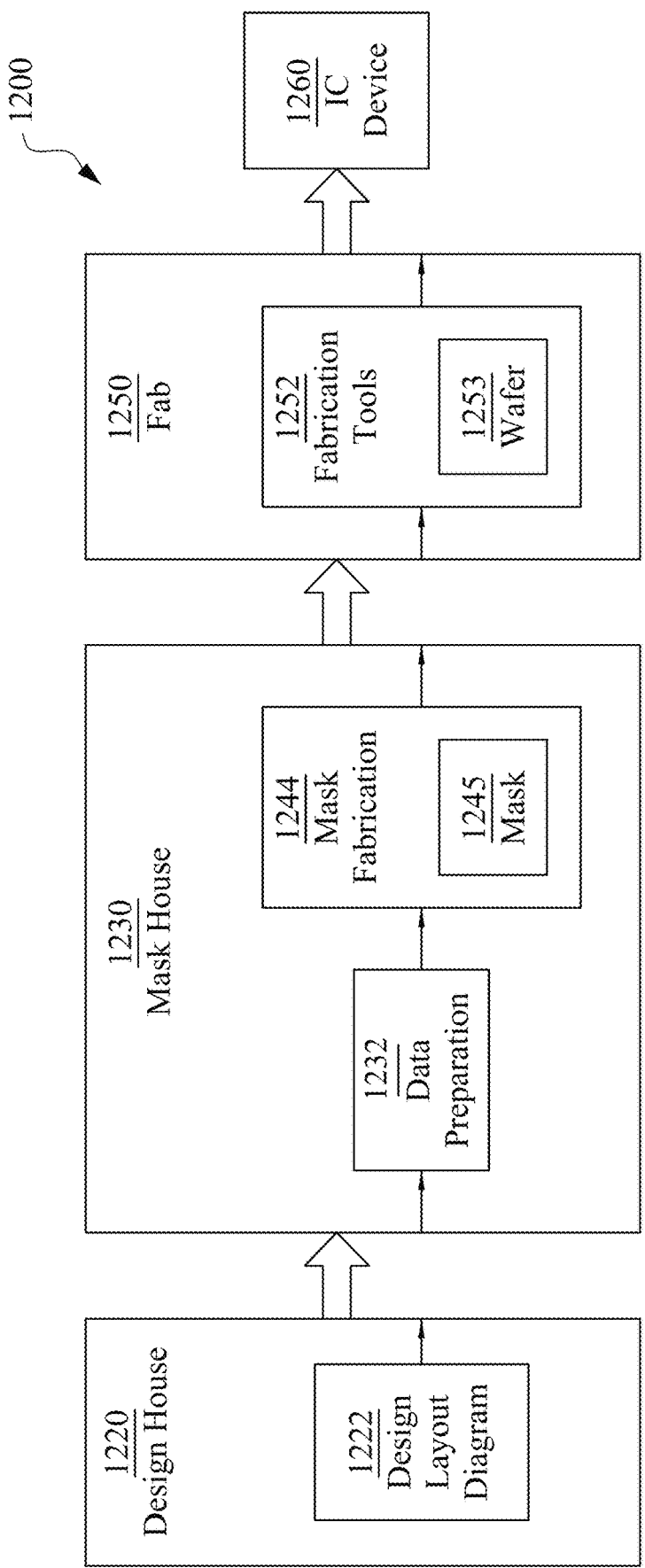
FIG. 12 is a block diagram of an integrated circuit (IC) manufacturing system, and an IC manufacturing flow associated therewith, in accordance with some embodiments.

FIG. 12 is a block diagram of an integrated circuit (IC) manufacturing system 1200, and an IC manufacturing flow associated therewith, in accordance with some embodiments.

In some embodiments, based on a layout diagram, at least one of (A) one or more semiconductor masks or (B) at least one component in a layer of a semiconductor integrated circuit is fabricated using manufacturing system 1200.

In FIG. 12, IC manufacturing system 1200 includes entities, such as a design house 1220, a mask house 1230, and an IC manufacturer/fabricator ("fab") 1250, that interact with one another in the design, development, and manufacturing cycles and/or services related to manufacturing an IC device 1260. The entities in system 1200 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1220, mask house 1230, and IC fab 1250 is owned by a single larger company. In some embodiments, two or more of design house 1220, mask house 1230, and IC fab 1250 coexist in a common facility and use common resources.

Design house (or design team) 1220 generates an IC design layout diagram 1222. IC design layout diagram 1222 includes various geometrical patterns designed for an IC device 1260. The geometrical patterns correspond to patterns of metal, oxide, or semiconductor layers that make up the various components of IC device 1260 to be fabricated. The various layers combine to form various IC features. For example, a portion of IC design layout diagram 1222 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 1220 implements a proper design procedure to form IC design layout diagram 1222. The design procedure includes one or more of logic design, physical design or place and route. IC design layout diagram 1222 is presented in one or more data files having information of the geometrical patterns. For example, IC design layout diagram 1222 can be expressed in a GDSII file format or DFII file format.

Mask house 1230 includes data preparation 1232 and mask fabrication 1244. Mask house 1230 uses IC design layout diagram 1222 to manufacture one or more masks 1245 to be used for fabricating the various layers of IC device 1260 according to IC design layout diagram 1222. Mask house 1230 performs mask data preparation 1232, where IC design layout diagram 1222 is translated into a representative data file ("RDF"). Mask data preparation 1232 provides the RDF to mask fabrication 1244. Mask fabrication 1244 includes a mask writer. A mask writer converts the RDF to an image on a substrate, such as a mask (reticle) 1245 or a semiconductor wafer 1253. The design layout diagram 1222 is manipulated by mask data preparation 1232 to comply with particular characteristics of the mask writer and/or requirements of IC fab 1250. In FIG. 12, mask data preparation 1232 and mask fabrication 1244 are illustrated as separate elements. In some embodiments, mask data preparation 1232 and mask fabrication 1244 can be collectively referred to as mask data preparation.

In some embodiments, mask data preparation 1232 includes optical proximity correction (OPC) which uses lithography enhancement techniques to compensate for image errors, such as those that can arise from diffraction, interference, other process effects and the like. OPC adjusts IC design layout diagram 1222. In some embodiments, mask data preparation 1232 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1232 includes a mask rule checker (MRC) that checks the IC design layout diagram 1222 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 1222 to compensate for limitations during mask fabrication 1244, which may undo part of the modifications performed by OPC in order to meet mask creation rules.

In some embodiments, mask data preparation 1232 includes lithography process checking (LPC) that simulates processing that will be implemented by IC fab 1250 to fabricate IC device 1260. LPC simulates this processing based on IC design layout diagram 1222 to create a simulated manufactured device, such as IC device 1260. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are repeated to further refine IC design layout diagram 1222.

It should be understood that the above description of mask data preparation 1232 has been simplified for the purposes of clarity. In some embodiments, data preparation 1232 includes additional features such as a logic operation (LOP) to modify the IC design layout diagram 1222 according to manufacturing rules. Additionally, the processes applied to IC design layout diagram 1222 during data preparation 1232 may be executed in a variety of different orders.

After mask data preparation 1232 and during mask fabrication 1244, a mask 1245 or a group of masks 1245 are fabricated based on the modified IC design layout diagram 1222. In some embodiments, mask fabrication 1244 includes performing one or more lithographic exposures based on IC design layout diagram 1222. In some embodiments, an electron-beam (e-beam) or a mechanism of multiple e-beams is used to form a pattern on a mask (photomask or reticle) 1245 based on the modified IC design layout diagram 1222. Mask 1245 can be formed in various technologies. In some embodiments, mask 1245 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 1245 includes a transparent substrate (e.g., fused quartz) and an opaque material (e.g., chromium) coated in the opaque regions of the binary mask. In another example, mask 1245 is formed using a phase shift technology. In a phase shift mask (PSM) version of mask 1245, various features in the pattern formed on the phase shift mask are configured to have proper phase difference to enhance the resolution and imaging quality. In various examples, the phase shift mask can be attenuated PSM or alternating PSM. The mask(s) generated by mask fabrication 1244 is used in a variety of processes. For example, such a mask(s) is used in an ion implantation process to form various doped regions in semiconductor wafer 1253, in an etching process to form various etching regions in semiconductor wafer 1253, and/or in other suitable processes.

IC fab 1250 includes fabrication tools 1252 configured to execute various manufacturing operations on semiconductor wafer 1253 such that IC device 1260 is fabricated in accordance with the mask(s), e.g., mask 1245. In various embodiments, fabrication tools 1252 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 1250 uses mask(s) 1245 fabricated by mask house 1230 to fabricate IC device 1260. Thus, IC fab 1250 at least indirectly uses IC design layout diagram 1222 to fabricate IC device 1260. In some embodiments, semiconductor wafer 1253 is fabricated by IC fab 1250 using mask(s) 1245 to form IC device 1260. In some embodiments, the IC fabrication includes performing one or more lithographic exposures based at least indirectly on IC design layout diagram 1222. Semiconductor wafer 1253 includes a silicon substrate or other proper substrate having material layers formed thereon. Semiconductor wafer 1253 further includes one or more of various doped regions, dielectric features, multi-level interconnects, and the like (formed at subsequent manufacturing steps).

Details regarding an integrated circuit (IC) manufacturing system (e.g., system 1200 of FIG. 12), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

In some embodiments, a method of fabricating a semiconductor device, includes: forming a semiconductor substrate having a first protected circuit; and forming a first guard ring around the first protected circuit including: forming a first wall configured to provide a first reference voltage; and forming a second wall configured to provide a second reference voltage different than the first reference voltage.

In some embodiments, the forming a first guard ring further includes: forming at least a third wall configured to provide the first reference voltage. In some embodiments, the method further includes: forming a buried power grid (BPG) beneath the semiconductor substrate; and wherein the forming a first guard ring further includes incorporating a portion of the BPG into the first guard ring. In some embodiments, the method further includes: the portion of the BPG includes at least one conductor provided in at least one via tower or in at least one via-bar tower. In some embodiments, the method further includes: forming a non-buried power grid (non-BPG) above the semiconductor substrate; and wherein the forming a first guard ring includes incorporating a portion of the non-BPG into the first guard ring. In some embodiments, the portion of the non-BPG includes at least one conductor in at least one via tower or in at least one via-bar tower. In some embodiments, the method further includes: forming a second protected circuit; and wherein: the forming a first guard ring includes disposing the first guard ring around the second protected circuit; the first protected circuit is a transistor driver array; and the second protected circuit is an array of electrostatic discharge clamp circuits.

In some embodiments, a method of operating a semiconductor device which includes: a first guard ring around a first protected circuit, the first guard ring including a first wall and a second wall, the method including biasing the first wall of the first guard ring with a first reference voltage; and biasing the second wall of the first guard ring with a second reference voltage different than the first reference voltage.

In some embodiments, the first guard ring further includes a third wall and the method further includes biasing the third wall of the first guard ring with the first reference voltage. In some embodiments, the semiconductor device includes a buried power grid (BPG) beneath a semiconductor substrate, and wherein at least one of the following is true: the biasing the first wall includes electrically coupling a portion of the BPG to the first wall; or the biasing the second wall includes electrically coupling a second portion of the BPG to the second wall.

In some embodiments, the first portion of the BPG includes at least one conductor provided in at least one via tower or in at least one via-bar tower; or the second portion of the BPG includes at least one conductor provided in at least one via tower or in at least one via-bar tower.

In some embodiments, the semiconductor device further includes a non-buried power grid (non-BPG) above the semiconductor substrate, and wherein at least one of the following is true: the biasing the first wall includes electrically coupling a first portion of the non-BPG to the first wall; or the biasing the second wall includes electrically coupling a second portion of the non-BPG to the second wall. In some embodiments, the first portion of the non-BPG includes at least one conductor in at least one via tower or in at least one via-bar tower; or the second portion of the non-BPG includes at least one conductor in at least one via tower or in at least one via-bar tower. In some embodiments, the method further includes: providing a second protected circuit; and wherein: the first guard ring is around the second protected circuit; the first protected circuit is a transistor driver array; and the second protected circuit is an array of electrostatic discharge clamp circuits.

In some embodiments, a method of manufacturing a semiconductor device, for which a corresponding layout diagram is stored on a non-transitory computer-readable medium, the method comprising generating the layout diagram includes: generating a semiconductor substrate (SS) shape that represents a semiconductor substrate having one or more active semiconductor components; generating supra-SS shapes over the SS shape and representing conductive structures formed over the SS shape, a subset of the supra-SS shapes including non-buried power grid (non-BPG) shapes which represent non-BPG conductive structures; generating sub-SS shapes under the SS shape and representing conductive structures formed below the SS shape, a subset of the sub-SS shapes including buried power grid (BPG) shapes which represent BPG conductive structures; configuring a first group of shapes to represent a first protected circuit, the first group including corresponding portions of the SS shape; and configuring a second group of shapes to represent a first guard ring shape around the first protected circuit, the second group including corresponding portions of the SS shape, corresponding ones of the supra-SS shapes including the non-BPG shapes, and corresponding ones of the sub-SS shapes including the BPG shapes.

In some embodiments, configuring a third group of shapes to represent a second guard ring around the first protected circuit and positioned between the first guard ring and the first protected circuit such that the first guard ring surrounds both the protected circuit and the second guard ring, the third group including corresponding portions of the SS shape, corresponding ones of the supra-SS shapes including the non-BPG shapes, and corresponding ones of the sub-SS shapes including the BPG shapes. In some embodiments, the second group represents a first guard ring configured to receive a first reference voltage; and the third group represents a second guard ring configured to receive a second reference voltage that is different than the first reference voltage. In some embodiments, the second group includes a first via tower shape or a first via-bar tower shape; and the third group includes a second via tower shape or a second via-bar tower shape. In some embodiments, the method further includes configuring a third group of shapes to represent a second protected circuit, the third group including corresponding portions of the SS shape; and wherein the first guard ring also is around the second protected circuit shape. In some embodiments, the first protected circuit includes a first electrostatic discharge (ESD) clamp circuit; and the second protected circuit includes a first transistor driver circuit. In some embodiments, the method further includes: configuring a fourth group of shapes to represent a third protected circuit, the fourth group including corresponding portions of the SS shape; configuring a fifth group of shapes to represent a fourth protected circuit, the fifth group including corresponding portions of the SS shape; and configuring a sixth group of shapes to represent a second guard ring around the third and fourth protected circuits, the sixth group including corresponding portions of the SS shape, corresponding ones of the supra-SS shapes including the non-BPG shapes, and corresponding ones of the sub-SS shapes including the BPG shapes. In some embodiments, configuring a seventh group of shapes to represent a third guard ring around the first and second guard rings, the seventh group including corresponding portions of the SS shape, corresponding ones of the supra-SS shapes including the non-BPG shapes, and corresponding ones of the sub-SS shapes including the BPG shapes. In some embodiments, the first protected circuit includes a first electrostatic discharge (ESD) clamp circuit shape; the second protected circuit includes a first transistor driver circuit shape; the third protected circuit includes a second ESD clamp circuit shape; and the second protected circuit includes a second transistor driver circuit shape.

In some embodiments, a method of manufacturing a semiconductor device, for which a corresponding layout diagram is stored on a non-transitory computer-readable medium, the method comprising generating the layout diagram including: generating shapes representing a first guard ring shape that includes non-buried power grid (non-BPR) shapes and buried power grid (BPR) shapes; generating first protected shapes interior to a perimeter formed by the first guard ring shape, the first protected shapes representing at least a first protected circuit; and wherein: the first guard ring shapes include first wall shapes and second wall shapes; the first wall shapes represent a first wall configured to receive a first reference voltage; and the second wall shapes represent a second wall configured to receive a second reference voltage.

In some embodiments, the first guard ring shape include at least two of wall shapes that represent at least two walls that are configured to receive the first reference voltage. In some embodiments, the method further includes: making, based on the layout diagram, one or more photolithographic exposures; or fabricating, based on the layout diagram, one or more masks; or fabricating, based on the layout diagram, one or more components of an integrated circuit.

In some embodiments, a method of manufacturing a semiconductor device, for which a corresponding layout diagram is stored on a non-transitory computer-readable medium, the method comprising generating the layout diagram includes: generating protected shapes representing a protected circuit; generating first guard ring shapes around the protected shapes, the first guard ring shapes representing a first guard ring around the protected circuit; and wherein: the first protected shapes include a non-buried power grid (non-BPG) shapes and buried power grid (BPG) shapes; and the first guard ring shapes include: a first wall shapes that represent a first wall configured to be biased at a first reference voltage; and a second wall shape that represents a second wall configured to be biased at a second reference voltage, the second reference voltage being different than the first reference voltage. In some embodiments, the first guard ring shape includes at least one other wall shape, each of the at least one other wall shape representing a wall that is configured to be biased at the first reference voltage.

In some embodiments, a semiconductor device, includes a semiconductor substrate having a first protected circuit; and a first guard ring around the first protected circuit, the first guard ring including: a first wall configured to provide a first reference voltage; and a second wall configured to provide a second reference voltage different than the first reference voltage.

In some embodiments, the semiconductor device further includes at least a third wall configured to provide the first reference voltage. In some embodiments, the semiconductor device further include a buried power grid (BPG) beneath the semiconductor substrate; and wherein the first guard ring includes at least a portion of the BPG. In some embodiments, the at least the portion of the BPG includes at least conductor provided in at least one via tower or at least one via-bar tower. In some embodiments, the semiconductor device further includes a non-buried power grid (non-BPG) above the semiconductor substrate; and wherein the first guard ring includes at least a portion of the non-BPG. In some embodiments, the at least the portion of the non-BPG includes at least one conductor in at least one via tower or at least one via-bar tower. In some embodiments, the semiconductor device further includes a second protected circuit; and wherein: the first guard ring is around the second protected circuit; the first protected circuit is a transistor driver array; and the second protected circuit is an array of electrostatic discharge clamp circuits.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of fabricating a semiconductor device, the method comprising:
    forming a semiconductor substrate having a first protected circuit; and
    forming a first guard ring; and
    forming a second guard ring adjacent to the first guard ring and around the first protected circuit including:
        forming a first wall configured to provide a first reference voltage;
        forming a second wall configured to provide a second reference voltage different than the first reference voltage; and
    forming at least a third wall configured to provide the first reference voltage.

2. The method of claim 1, further comprising:
    forming a buried power grid (BPG) beneath the semiconductor substrate; and
    wherein the forming a second guard ring further includes:
        incorporating a portion of the BPG into the second guard ring.

3. The method of claim 2, wherein:
    the second guard ring is formed on a first side of the semiconductor substrate, and
    the forming a BPG beneath the semiconductor substrate includes:
        forming the BPG on a second side of the semiconductor substrate opposite the first side.

4. The method of claim 2, wherein:
    the portion of the BPG includes at least one conductor provided in at least one via tower or in at least one via-bar tower.

5. The method of claim 1, further comprising:
    forming a non-buried power grid (non-BPG) above the semiconductor substrate; and
    wherein the forming a second guard ring further includes:
        incorporating a portion of the non-BPG into the second guard ring.

6. The method of claim 5, wherein:
    the portion of the non-BPG includes at least one conductor in at least one via tower or in at least one via-bar tower.

7. The method of claim 1, further comprising:
    forming a second protected circuit; and
    wherein:
        the forming a second guard ring further includes:
            disposing the second guard ring around the second protected circuit;
        the first protected circuit is a transistor driver array; and
        the second protected circuit is an array of electrostatic discharge clamp circuits.

8. A method of operating a semiconductor device which includes a first guard ring, a second guard ring adjacent to the first guard ring and around a first protected circuit, the second guard ring including a first wall, a second wall, and a third wall, the method comprising:
    biasing the first wall of the second guard ring with a first reference voltage;
    biasing the second wall of the second guard ring with a second reference voltage different than the first reference voltage; and
    biasing the third wall of the second guard ring with the first reference voltage.

9. The method of claim 8, wherein:
    the semiconductor device further includes a buried power grid (BPG) beneath a semiconductor substrate; and
    at least one of the following is true:
        the biasing the first wall includes:
            electrically coupling a first portion of the BPG to the first wall; or
        the biasing the second wall includes:
            electrically coupling a second portion of the BPG to the second wall.

10. The method of claim 9, wherein:
    the second guard ring is on a first side of a semiconductor substrate,
    the BPG is on a second side of the semiconductor substrate, and
    at least one of the following is true:
        the biasing the first wall includes:
            electrically coupling a first portion of the BPG on the second side of the semiconductor substrate to the first wall on the first side of the semiconductor substrate; or
        the biasing the second wall includes:
            electrically coupling a second portion of the BPG on the second side of the semiconductor substrate to the second wall on the first side of the semiconductor substrate.

11. The method of claim 9, wherein:
    the first portion of the BPG includes at least one conductor provided in at least one via tower or in at least one via-bar tower; or
    the second portion of the BPG includes at least one conductor provided in at least one via tower or in at least one via-bar tower.

12. The method of claim 8, wherein:

the semiconductor device further includes a non-buried power grid (non-BPG) above a semiconductor substrate; and at least one of the following is true:

the biasing the first wall includes:

electrically coupling a first portion of the non-BPG to the first wall; or the biasing the second wall includes:

electrically coupling a second portion of the non-BPG to the second wall.

13. The method of claim 12, wherein:

the first portion of the non-BPG includes at least one conductor in at least one via tower or in at least one via-bar tower; or the second portion of the non-BPG includes at least one conductor in at least one via tower or in at least one via-bar tower.

14. A semiconductor device, comprising:

a semiconductor substrate having a first protected circuit;

a first guard ring; and a second guard ring adjacent to the first guard ring and around the first protected circuit, the second guard ring including:

a first wall configured to provide a first reference voltage;

a second wall configured to provide a second reference voltage different than the first reference voltage; and at least a third wall configured to provide the first reference voltage.

15. The semiconductor device of claim 14, further comprising:

a buried power grid (BPG) beneath the semiconductor substrate; and wherein the second guard ring includes at least a portion of the BPG.

16. The semiconductor device of claim 15, wherein:

the second guard ring is on a first side of a semiconductor substrate, and the BPG is on a second side of the semiconductor substrate opposite the first side.

17. The semiconductor device of claim 15, wherein:

the at least the portion of the BPG includes at least one conductor provided in at least one via tower or at least one via-bar tower.

18. The semiconductor device of claim 15, further comprising:

a non-buried power grid (non-BPG) above the semiconductor substrate; and wherein the second guard ring includes at least a portion of the non-BPG.

19. The semiconductor device of claim 18, wherein the at least the portion of the non-BPG includes at least one conductor in at least one via tower or at least one via-bar tower.

20. The semiconductor device of claim 14, further comprising:

a second protected circuit; and wherein:

the second guard ring is around the second protected circuit;

the first protected circuit is a transistor driver array; and the second protected circuit is an array of electrostatic discharge clamp circuits.

* * * * *